(12) United States Patent
Islam et al.

(10) Patent No.: US 7,233,432 B2
(45) Date of Patent: Jun. 19, 2007

(54) PRE-EMPHASIZED OPTICAL COMMUNICATION

(75) Inventors: Mohammed N. Islam, Allen, TX (US); Michael J. Freeman, Northville, MI (US); Amos Kuditcher, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 698 days.

(21) Appl. No.: 10/232,349

(22) Filed: Aug. 30, 2002

(65) Prior Publication Data

US 2004/0047020 A1    Mar. 11, 2004

Related U.S. Application Data

(63) Continuation-in-part of application No. 10/028,576, filed on Dec. 20, 2001, now Pat. No. 6,819,479.

(51) Int. Cl.
*H01S 3/00* (2006.01)
(52) U.S. Cl. .................. 359/337; 359/334; 398/94
(58) Field of Classification Search ................ 353/334, 353/337; 398/94
See application file for complete search history.

(56) References Cited

U.S. PATENT DOCUMENTS

| | | | | |
|---|---|---|---|---|
| 5,060,302 A | | 10/1991 | Grimes .................... 359/135 |
| 5,225,922 A | * | 7/1993 | Chraplyvy et al. ........... 398/94 |
| 5,790,289 A | | 8/1998 | Taga et al. ................ 359/124 |
| 5,801,860 A | | 9/1998 | Yoneyama ................ 359/124 |
| 5,852,510 A | | 12/1998 | Meli et al. ................ 359/341 |
| 5,959,766 A | | 9/1999 | Otterbach et al. .......... 359/337 |
| 6,040,933 A | | 3/2000 | Khaleghi et al. .......... 359/124 |
| 6,067,177 A | | 5/2000 | Kanazawa ................ 359/124 |
| 6,104,848 A | | 8/2000 | Toyohara et al. .......... 385/24 |
| 6,115,157 A | | 9/2000 | Barnard et al. ............ 359/124 |
| 6,134,034 A | | 10/2000 | Terahara ................... 359/124 |
| 6,185,022 B1 | | 2/2001 | Harasawa ................. 359/124 |
| 6,219,162 B1 | | 4/2001 | Barnard et al. ............ 359/124 |
| 6,271,945 B1 | | 8/2001 | Terahara ................... 359/124 |
| 6,404,523 B1 | | 6/2002 | Morikawa et al. ......... 359/124 |
| 6,810,214 B2 | * | 10/2004 | Chbat et al. ............... 398/160 |
| 6,859,622 B1 | * | 2/2005 | Jiang et al. ................ 398/25 |

(Continued)

FOREIGN PATENT DOCUMENTS

EP    0 829 980 A2    3/1998

(Continued)

OTHER PUBLICATIONS

Chraplyvy et al., "Equalization in Amplified WDM Lightwave Transmission Systems," IEEE Photonics Technology Letters, vol. 4, No. 8, pp. 920-922, Aug. 1992.

(Continued)

*Primary Examiner*—Mark Hellner
(74) *Attorney, Agent, or Firm*—Baker Botts L.L.P.

(57) ABSTRACT

In one of several embodiments, a method of communicating optical signals comprises communicating a plurality of optical signals over an optical communications medium, wherein each of at least some of the plurality of optical signals comprises a launch power that is a function of a noise property measured at or near a center wavelength of that signal. Launch powers of the plurality of optical signals primarily decrease with increasing center wavelengths of the plurality of optical signals.

71 Claims, 10 Drawing Sheets

U.S. PATENT DOCUMENTS

| | | | |
|---|---|---|---|
| 6,862,135 B2* | 3/2005 | Evans et al. | 359/337.1 |
| 2002/0048062 A1 | 4/2002 | Sakamoto et al. | 359/124 |
| 2002/0060821 A1 | 5/2002 | Manna et al. | 359/124 |

FOREIGN PATENT DOCUMENTS

| | | |
|---|---|---|
| EP | 0 959 578 A2 | 11/1999 |

OTHER PUBLICATIONS

Tonguz et al., "Gain Equalization of EDFA Cascades, Journal of Lightwave Technology," vol. 15, No. 10, pp. 1832-1841, Oct. 1997.

Forghieri et al., "Simple Model of Optical Amplifier Chains to Evaluate Penalties in WDM Systems," Journal of Lightwave Technology, vol. 16, No. 9, pp. 1570-1576, Sep. 1998.

Letellier et al., "Access to Transmission Performance Margins Through Per-emphasis Adjustment in WDM Systems," ECOC, pp. 275-276, Sep. 20-24, 1998.

Manna et al., "Modeling of Penalties on Chains of Optical Amplifiers with Equalizing Filters," Journal of Lightwave Technology, vol. 18, No. 3, pp. 295-300, Mar. 2000.

Fludger et al., "Fundamental Noise Limits in Broadband Ramen Amplifiers," OFC, pp. MA5/1-MA5/3, Mar. 17-22, 2001.

Menif et al., "Application of Preemphasis to Achieve Flat Output OSNR in Time-Varying Channels in Cascaded EDFAs Without Equalization," Journal of Lightwave Technology, vol. 19, No. 10, pp. 1440-1452, Oct. 2001.

Murakami et al., "WDM Upgrading of an Installed Submarine Optical Amplifier System," Journal of Lightwave Technology, vol. 19, No. 11, pp. 1665-1674, Nov. 2001.

Scheerer et al., "SRS crosstalk in preemphasized WDM Systems," pp. WM28-1/293-WM28-3/295.

* cited by examiner

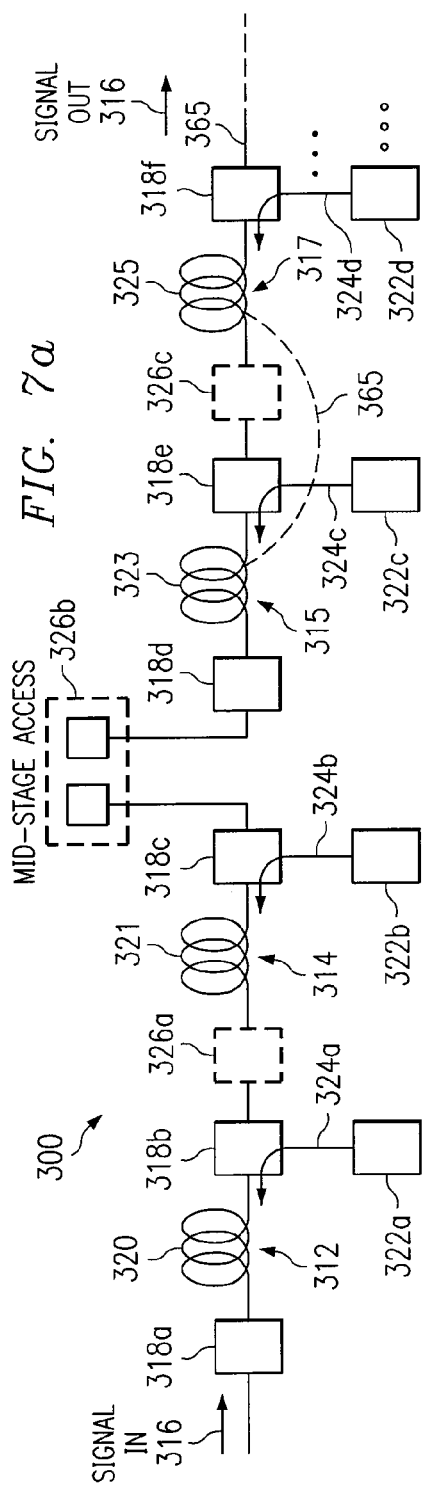
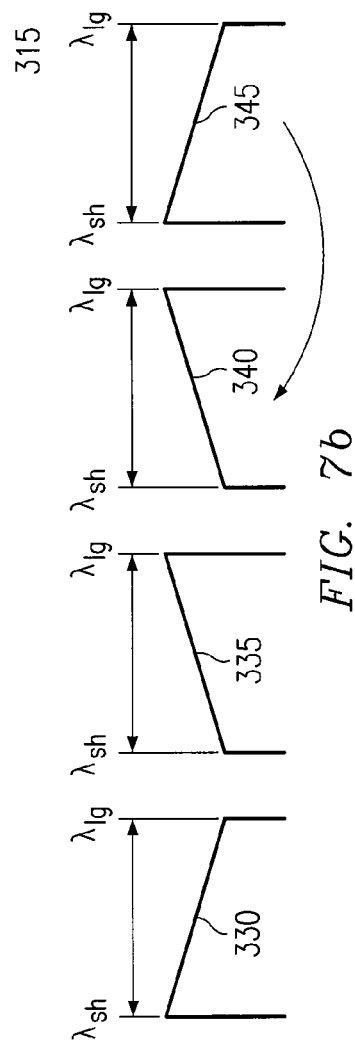
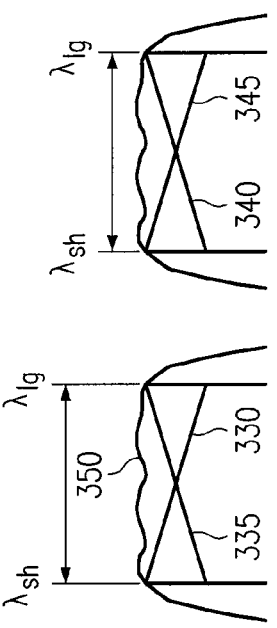
FIG. 7a
FIG. 7b
FIG. 7c

PRE-EMPHASIZED OPTICAL COMMUNICATION

RELATED APPLICATIONS

This application is a continuation-in-part of U.S. application Ser. No. 10/028,576 filed Dec. 20, 2001, now U.S. Pat. No. 6,819,479 and entitled Optical Amplification Using Launched Signal Powers Selected as a Function of a Noise Figure.

TECHNICAL FIELD OF THE INVENTION

The present invention relates generally to communication systems, and more particularly to a system and method for providing optical communication using input signals pre-emphasized based on one or more characteristics associated with the signals being communicated.

BACKGROUND

In designing a wavelength division multiplexed optical transmission link including multiple spans of fiber with optical amplifiers interposed between the spans, conventional design approaches have often assumed that the noise figure for the system is spectrally flat and equal in magnitude to the worst case noise figure for the system. Designers of these systems calculate a desired signal to noise ratio (SNR) as a function of the number of spans in the system, and select a launch power for wavelength signals input to the system that ensures that all channels will achieve the desired SNR, even at wavelengths having the highest noise figure. Generally, designers apply the same launch power to all wavelength signals.

Some systems implementing Erbium doped amplifiers have been designed to pre-emphasize signal input powers to address the predictable wavelength dependent gain characteristics inherent to the Erbium doped amplifiers. In typical implementations, absent the use of other gain flattening elements, this often results in a primarily positive or a relatively flat slope of the input signal spectrum as wavelengths increase. In addition, these systems often require that the total input signal power always remain at a constant level.

SUMMARY OF EXAMPLE EMBODIMENTS

The present invention recognizes a need for a more efficient optical communications system and method of communicating signals.

In a method aspect, a method of communicating optical signals comprises communicating a plurality of optical signals over an optical communications medium. Each of at least some of the plurality of optical signals comprises a launch power that is a function of a noise property measured at or near a center wavelength of that signal. The launch powers of the plurality of optical signals primarily decrease with increasing center wavelengths of the plurality of optical signals.

In another aspect, a method of communicating optical signals comprises communicating within an optical communication medium a plurality of optical signals each having an input signal power when entering the communication medium. The method further comprises measuring a signal characteristic associated with at least some of the plurality of optical signals that varies over the wavelengths of the plurality of optical signals. The method also comprises adjusting, based at least in part on the measured signal characteristic, the input signal power of at least some of the plurality of optical signals to result in a reduction in variation of the signal characteristic over the wavelengths of the plurality of optical signals. The adjusted input signal powers of the plurality of optical signals primarily decrease with increasing center wavelengths of the plurality of optical signals.

In still another aspect, a method of communicating optical signals comprises communicating a plurality of optical signals to an optical communications medium, at least one of the plurality of optical signals associated with a first signal to noise ratio at an output from the optical communications medium. Each of at least some of the plurality of optical signals comprises a launch power that is a function of a noise property measured at or near a center wavelength of that signal. A sum of the launch powers of the plurality of optical signals comprises a lower total power than would result from all of the plurality of optical signals being launched at the same launch power sufficient for each of the plurality of optical signals to obtain at least the first signal to noise ratio at the output from the optical communications medium.

In yet another aspect, a method of communicating optical signals comprises communicating to an optical communication medium a plurality of optical signals each initially having an approximately equal input signal power when entering the communication medium, wherein a sum of the input signal powers of the plurality of optical signals comprises a total input signal power. The method also comprises measuring a signal characteristic associated with the plurality of optical signals that varies over the wavelengths of the plurality of optical signals and adjusting, based at least in part on the measured signal characteristic, the input signal power of at least some of the plurality of optical signals to result in a reduction in variation of the signal characteristic over the wavelengths of the plurality of optical signals. The adjustment in input signal power results in a reduction in the total input signal power compared to a sum of the initial input signal powers.

In another aspect, an optical amplifier comprises a gain medium operable to communicate a plurality of optical signals each comprising a center wavelength. The amplifier includes one or more pump sources operable to generate one or more pump signals for introduction to the gain medium to facilitate Raman amplification of at least some of the plurality of optical signals within the gain medium. At least a portion of the optical amplifier is associated with a noise property that varies with wavelength. Each of at least some of the plurality of optical signals comprises a launch power that is a function of the noise property measured at or near a center wavelength of that signal. The launch powers of the plurality of optical signals primarily decrease with increasing center wavelengths of the plurality of optical signals.

In yet another aspect, an optical amplifier comprises a gain medium operable to communicate a plurality of optical signals each comprising a center wavelength, at least one of the plurality of optical signals associated with a first signal to noise ratio at an output from a communication medium coupled to the gain medium. The amplifier further comprises one or more pump sources operable to generate one or more pump signals for introduction to the gain medium to facilitate Raman amplification of at least some of the plurality of optical signals within the gain medium. At least a portion of the optical amplifier is associated with a noise property varying with wavelength. Each of at least some of the plurality of optical signals comprises a launch power that is a function of the noise property measured at or near a center wavelength of that signal. A sum of the launch powers of the plurality of optical signals comprises a lower total power than would result from all of the plurality of optical signals being launched at the same launch power sufficient for each of the plurality of optical signals to obtain at least the first signal to noise ratio at the output from the optical communications medium.

In still another aspect, a two stage Raman amplifier comprises a first Raman amplifier stage operable to receive a plurality of optical signals each having a center wavelength. At least some of the plurality of optical signals have a launch power that is a function of a noise property associated with that signal. The amplifier further comprises a second Raman amplifier stage operable to receive from the first Raman amplifier stage at least some of the plurality of optical signals. The second Raman amplifier stage is coupled to the first Raman amplifier stage, and a multi-path interference associated with at least some of the plurality of optical signals is no more than −20 decibels.

In yet another aspect, an optical communication system comprises one or more optical sources operable to generate a plurality of optical signals each comprising a center wavelength. The system also comprises a plurality of Raman amplifiers coupled to a multiple span communications medium carrying the plurality of optical signals. The system further comprises a controller operable to measure a signal characteristic associated with the plurality of optical signals that varies with wavelength, and to adjust based at least in part on the measured signal characteristic an input signal power of at least some of the plurality of optical signals. The adjustment of the input signal power results in a reduction in variation of the signal characteristic over the wavelengths of the plurality of optical signals. The adjustment in input signal power further results in input signal powers that primarily decrease with increasing center wavelengths of the plurality of optical signals.

In yet another aspect, an optical communication system comprising one or more optical sources operable to generate a plurality of optical signals each comprising a center wavelength and having an initial input power, and a plurality of Raman amplifiers coupled to a multiple span communications medium carrying the plurality of optical signals. The system also comprises a controller operable to measure a signal characteristic associated with the plurality of optical signals that varies with wavelength and to adjust, based at least in part on the measured signal characteristic, an input signal power of at least some of the plurality of optical signals. T adjustment of the input signal power results in a reduction in variation of the signal characteristic over the wavelengths of the plurality of optical signals, and a reduction in the total input signal power compared to the sum of the initial input powers.

In yet another aspect, an optical communication system comprises one or more optical sources operable to generate a plurality of optical signals each comprising a center wavelength and a plurality of optical amplifiers coupled to a multiple span communications medium carrying the plurality of optical signals. In this embodiment, all of the plurality of optical amplifiers are Raman amplifiers. The system also includes a controller operable to measure a signal characteristic associated with the plurality of optical signals that varies with wavelength, and to adjust based at least in part on the measured signal characteristic an input signal power of at least some of the plurality of optical signals. The adjustment of the input signal power results in a reduction in variation of the signal characteristic over the wavelengths of the plurality of optical signals.

Depending on the specific features implemented, particular embodiments may exhibit some, none, or all of the following technical advantages. One embodiment provides a mechanism for reducing the total launched signal power in an optical link. Reducing the launched signal power reduces the intensity of light on connectors and other components, increasing the reliability of the system. Additionally, reduced launched signal power allows for use of lower powered pumps in amplifiers within the system. Reducing the pump power required generally results in decreased system costs. These techniques can result in reduced non-linear penalties, such as four-wave mixing and Brillouin effect, which tend to be less prevalent at lower signal powers.

In some embodiments, the pre-emphasis applied to the input signal spectrum can result in input signals having powers that primarily decrease with increasing center wavelengths of the plurality of optical signals. At least in Raman amplifiers, the primarily decreasing input power levels provides an advantage of increasing the signal to noise ratio of shorter wavelength signals, which, being closest to the pump wavelengths, typically see the most thermal phonon induced noise. Moreover, a the primarily decreasing input power levels can facilitate an additional reduction in total signal power. For example, increasing the power of the shorter wavelength signals allows for reduction in power to longer wavelength signals. In this configuration, longer wavelength signals can accept energy from the positively emphasized shorter wavelength channels through the signal-to-signal Raman effect.

As an additional benefit, providing a primarily negatively sloped signal profile facilitates freedom in design of gain profiles in multiple stage amplifiers. Because signal launch power is selected to at least partially address the noise figure issue, gain profiles of the amplifiers can be selected with less regard to maintaining a particular noise figure shape or magnitude. This can reduce the need to provide relatively high gain levels to any particular wavelength range, reducing multi-path interference (MPI). By reducing MPI, amplifier designers can implement fewer amplifier stages, each having a relatively flat gain profile. By reducing MPI through pre-emphasis of input signal powers, amplifier designers can sometimes reduce or eliminate the need for lossy isolators between some amplifier stages.

Other technical advantages of the present invention will be readily apparent to one skilled in the art from the following figures, description and claims.

BRIEF DESCRIPTION OF THE DRAWINGS

For a more complete understanding of the present invention, and for further features and advantages thereof, reference is now made to the following description taken in conjunction with the accompanying drawings, in which:

FIGS. 7a–7c illustrate another exemplary embodiment of a multiple stage amplifier including at least four amplification stages, gain profiles associated with various amplification stages of the amplifier, and an overall gain profile for the amplifier, respectively;

DETAILED DESCRIPTION OF EXAMPLE EMBODIMENTS

Figure 1:
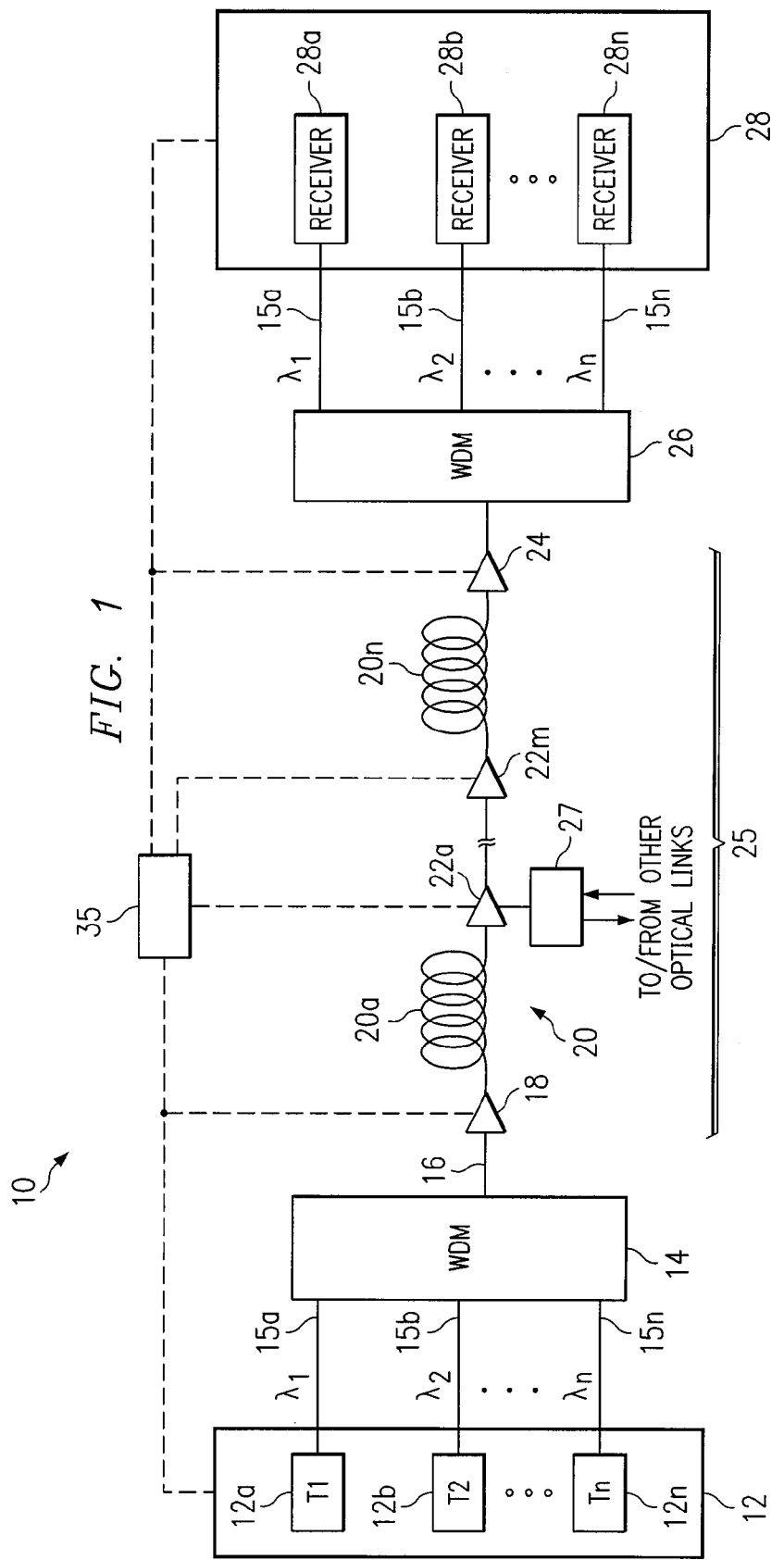
FIG. 1 is a block diagram showing an exemplary optical communication system implementing at least some aspects of the present invention.

FIG. 1 is a block diagram showing an exemplary optical communication system 10 operable to facilitate communication of one or more multiple wavelength signals. System 10 can be configured to provide unidirectional or bi-directional communication of multiple wavelength signals. In this example, system 10 includes a transmitter bank 12 operable to generate a plurality of optical signals (or channels) 15a–15n, each comprising a center wavelength of light. In a particular embodiment, each optical signal 15 can comprise a center wavelength substantially different from the center wavelengths of other optical signals 15. As used throughout this document, the term "center wavelength" refers to a time averaged mean of the spectral distribution of an optical signal. The spectrum surrounding the center wavelength need not be symmetric about the center wavelength. Moreover, there is no requirement that the center wavelength represent a carrier wavelength.

Transmitters 12 could reside, for example, within a transponder capable of transmitting and receiving signals. In one embodiment, the "plurality of transmitters" of transmitter bank 12 comprises a plurality of independent optical sources each with an associated modulator. Alternatively, the "plurality of transmitters" could comprise one or more optical sources shared by a plurality of modulators. For example, transmitter bank 12 could comprise a continuum source transmitter including a modelocked source operable to generate a series of optical pulses and a continuum generator operable to receive a train of pulses from the modelocked source and to spectrally broaden the pulses to form an approximate spectral continuum of signals. The continuum generator could operate, for example using solition-effect compression or adiabatic solition compression. A signal splitter receives the continuum and separates the continuum into individual signals each having a center wavelength. Modulators operate to encode information onto the signals received to produce signals 15 for transmission to optical communications medium 20. In some embodiments, transmitter bank 12 can also include a pulse rate multiplexer, such as a time division multiplexer, operable to multiplex pulses received from the mode locked source or the modulator to increase the bit rate of the system.

In the illustrated embodiment, system 10 also includes a combiner 14 operable to receive a plurality of optical signals 15a–15n and to combine those wavelength signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or dense wavelength division multiplexed signals.

System 10 communicates multiple wavelength optical signal 16 over an optical communication medium 20. Communication medium 20 can comprise a plurality of spans 20a–20n of fiber, each coupled to or comprising an optical amplifier. In some embodiments all or a portion of a span can serve as a distributed amplification stage. Fiber spans 20a–20n could comprise standard single mode fiber (SMF), dispersion-shifted fiber (DSF), non-zero dispersion-shifted fiber (NZDSF), or another fiber type or combination of fiber types.

Two or more spans of communication medium 20 can collectively form an optical link. In the illustrated example, communication medium 20 includes a single optical link 25 comprising numerous spans 20a–20n. System 10 could include any number of additional links coupled to link 25. Although optical link 25 is shown to include one or more booster amplifiers 18 and preamplifiers 24, one or more of these amplifier types could be eliminated in other embodiments.

In this example, system 10 includes a booster amplifier 18 operable to receive and amplify wavelengths of signal 16 in preparation for transmission over a communication medium 20. Where communication system 10 includes a plurality of fiber spans 20a–20n, system 10 can also include one or more in-line amplifiers 22a–22m. In-line amplifiers 22 couple to one or more spans 20a–20n and operate to amplify signal 16 as it traverses communication medium 20. Optical communication system 10 can also include a preamplifier 24 operable to amplify signal 16 received from a final fiber span 20n.

Throughout this document, the term "amplifier" denotes a device or combination of devices operable to at least partially compensate for at least some of the losses incurred by signals while traversing all or a portion of optical link 25. Likewise, the term "amplification" refers to offsetting at least a portion of losses that would otherwise be incurred.

An amplifier may, or may not impart a net gain to a signal being amplified. Moreover, the term "gain" as used throughout this document, does not—unless explicitly specified—require a net gain. In other words, it is not necessary that a signal experiencing "gain" or "amplification" in an amplifier stage experiences enough gain to overcome all losses in the amplifier stage. As a specific example, distributed Raman amplifier stages typically do not experience a net gain because of the high losses in the transmission fiber that serves as a gain medium. Nevertheless, these devices are considered "amplifiers" because they offset at least a portion of the losses experienced in the transmission filter.

Amplifiers 18, 22, and 24 could each comprise, for example, a discrete Raman amplifier, a distributed Raman amplifier, a rare earth doped amplifier such as an erbium doped or thulium doped amplifier, a semiconductor amplifier or a combination of these or other amplifier types.

In some embodiments, amplifiers 18, 22, and 24 could each comprise a wide band amplifier operable to amplify all signal wavelengths received. Alternatively, one or more of those amplifiers could comprise a parallel combination of amplifier assemblies, each operable amplify a portion of the wavelengths of multiple wavelength signal 16. In that case, system 10 could incorporate signal dividers and signal combiners surrounding the parallel combinations of amplifier assemblies to facilitate separation of the wavelength groups prior to amplification and recombination of the wavelengths following amplification.

System 10 may further include one or more access elements 27. For example, access element 27 could comprise an optical add/drop multiplexer, a cross-connect, dispersion compensating element, gain equalizer, or another device operable to terminate, cross-connect, switch, route, process, and/or provide access to and from optical link 25 and another optical link or communication device.

System 10 also includes a separator 26 operable to separate individual optical signals 15a–15n from multiple wavelength signal 16. Separator 26 can communicate individual signal wavelengths or ranges of wavelengths to a bank of receivers 28 and/or other optical communication paths. Separator 26 may comprise, for example, a wavelength division demultiplexer (WDM).

In some embodiments, system 10 can also comprise a management system 35 operable to track and/or manage various aspects of operation of system 10 and/or the components therein. For example, management system 35 could comprise hardware, software, firmware, or a combination thereof operable to selectively adjust the launch power of an optical signal 15, a pump power applied to an amplifier in system 10, or an attenuation level of an adjustable spectral loss element, such as a gain equalizer. In some embodiments, management system 35 can measure or receive a signal characteristic associated with all or a portion of system 10, determine launch powers for signals 15 based at least in part on the signal characteristic, and communicate control signals to adjust launch powers of one or more signals 15 accordingly. In one particular embodiment, management system 35 measures the aggregate level of the characteristic at an output from the system.

Although the illustrated embodiment shows management system 35 directly coupled to each amplifier, transmitter, and receiver, management system could alternatively communicate with some or all of those devices via communication medium 20 using, for example, a unidirectional or a bi-directional optical service channel. Furthermore, management system 35 need not, in all embodiments, communicate with all amplifiers, transmitters, and receivers. Although management system 35 is depicted as a single entity located remotely from amplifiers 18–24, all or a part of management system 35 could alternatively reside locally to one or more amplifiers, transmitters, and/or receivers in system 10.

Management system 35 could be used to aid in manually configuring system 10, or could operate to dynamically configure system 10 initially and/or as it continues to operate. Management system 35 could be used to initially set launch powers for optical signals 15 and/or to periodically, randomly, or on demand reconfigure launch powers of optical signals 15 to account for changing system parameters.

Management system 35 may implement one or more mechanisms for measuring signal characteristics used to determine signal launch power. For example, management system 35 may include a spectrum analyzer operable to measure noise at an output of system 10. In one embodiment, the composite noise figure of the system is measured for use in determining launch powers. While spectrum analyzers can give an approximate measure of noise, they often do not accurately account for signal non-linearities. For example, most spectrum analyzers improperly count multi-path interference (MPI) and four wave mixing (FWM) as part of the signal, rather than the noise.

Management system 35 may implement one or more techniques for properly accounting for signal non-linearities. As one example, management system 35 can turn individual channels on and off and track power as a function of time to determine MPI. Management system 35 can determine and account for the non-linear effect of four wave mixing, for example, by leaving one channel off, and turning adjacent channels on and off. While these techniques may be most useful during system set-up, under various circumstances they may also be useful during system operation. For example, particular channels could be designated to perform system characterization and measurement during traffic flow. In one embodiment, these calibration channels could reside just beyond the end of the useable signal wavelength of signal 16. Alternatively, or in addition, a number of channels within the useable wavelength range of signal 16 could be used as calibration channels. These channels could be at fixed wavelengths, or could be rotated so that data carrying channels can be sequentially characterized without significantly affecting the total data throughput of the system. Alternatively, calibration routines could be run when the data being sent over a channel or each channel in a group of channels was less than or much less than the channel's capacity.

The bit error rate or Q-factor can also be used to determine appropriate launch power. For example, forward error correction circuitry can determine bit error rates associated with each channel. Alternatively, or in addition, electronic synchronization circuitry at a receiver can be used to average the power level of the "1"s received, and to average separately the power level of the "0"s received over a given number of bits or a given length of time. Monitoring these averages over time allows an accurate determination of the Q-factor and/or BER. In some cases, sampling circuitry bandwidth can be reduced by sampling only strings of "N" 1's and/or "N" 0's in a row (where "N" is an integer greater than 1).

Management circuitry can utilize any one, some, or all of these techniques or other techniques to ascertain the value of an optical characteristic useful in determining an adjustment to a signal launch power.

In designing a wavelength division multiplexed optical transmission link including multiple spans of fiber with optical amplifiers interposed between the spans, designers generally establish a minimum desired signal to noise ratio (SNR) based on the receiver and any forward error correction circuitry used. Then, knowing the noise figure of each amplifier, a launch power for wavelength signals input to the system is then selected that ensures that all channels will achieve the desired SNR, even at wavelengths where the noise figure is highest. Throughout this description, the phrase "launch power" refers to a signal's power at the input to any portion of system 10 over which the signal characteristic will be measured for use in determining or modifying the signal's launch power.

Many conventional design approaches assume that the noise figure for the system is spectrally flat and equal in magnitude to the worst case noise figure for the system. In some systems, therefore, designers apply the same launch power to all wavelength signals. That launch power is selected for all wavelengths based on the signal power needed to achieve a desired SNR at the wavelength experiencing the highest noise figure. Applying a constant launch power to all wavelength signals, however, can be inefficient because the noise figure (and other signal characteristics related to noise, such as BER, SNR, and Q-factor) in implemented optical systems is not always constant.

Some designers of Erbium doped amplification systems have launched signals at different powers for different wavelengths to account for the predictable wavelength dependent gain characteristics of Erbium doped amplifiers. These approaches almost always involve providing wavelengths in the middle or longer end of the spectrum with the highest launch powers. In typical implementations, absent the use of additional gain flattening elements, the signal spectra of these approaches typically exhibit a primarily positive or a relatively flat slope. In addition, these techniques typically require that the sum of the launch powers of the input signals always remains a constant.

One aspect of this disclosure recognizes that signal pre-emphasis can be used to reduce the total power of the input signals to an optical communication system, while maintaining or improving the signal to noise ratio. Further input signal power reduction can be attained through intelligent shaping of the input signal pre-emphasis curve to take advantage of constructive signal-to-signal energy transfers.

For example, the total input power of the optical signals can be reduced by implementing signal spectrum where signal power primarily decreases as wavelength increases, to encourage constructive signal-signal interaction. Throughout this description, the phrase "primarily decreases as wavelength increases" refers to a situation where, for the most part, signals with longer wavelengths have lower powers than signals with shorter wavelengths. The presence of any particular longer wavelength signals having higher power than any shorter wavelength signals is not intended to be outside of the scope of signals with power that "primarily decreases as wavelength increases."

This disclosure recognizes that pre-emphasizing shorter wavelength signals with higher power can shift the point along the signal wavelength spectrum where signal-to-signal induced loss equals signal-to-signal induced gain. By reducing the wavelength where induced loss equals induced gain, this technique allows more wavelengths along the signal spectrum to benefit from constructive signal-to-signal interactions (e.g., experience gain). Additionally, if the total signal power is held constant while applying a primarily negative slope, the magnitude of induced gain increases at substantially all wavelengths experiencing induced gain, and the magnitude of induced loss is decreased at substantially all wavelengths experiencing induced loss. By leveraging signal-to-signal interactions, this feature promotes further reduction of the total input signal power needed to achieve a target signal to noise ratio.

Moreover, reducing the total input signal power, and in particular reducing the power of longer wavelength signals and increasing the signal-signal gain they experience, facilitates a reduction of the power level and gain produced by the long wavelength pumps used to amplify those signals. At least in systems using Raman amplifiers, reducing the power of the longer wavelength pumps helps reduce thermally induced noise caused by the long wavelength pumps being in close frequency proximity to the short wavelength signals. This tends to reduce the noise figure associated with the shorter wavelength signals.

In addition, in these systems the primarily decreasing input power levels with increasing wavelength provide relatively high power to shorter wavelength signals often closest to the pump wavelength signals. Providing relatively high power to the signals closest to the pump wavelengths provides an advantage of maintaining a good signal to noise ratio for these signals, despite the thermally induced noise experienced by these signals as a result of their proximity to the pump wavelengths and the induced loss they typically experience due to signal-signal interactions.

By addressing noise figure concerns with a pre-emphasis technique, amplifiers can be designed using relatively flat gain profiles. Reducing the total input signal power and facilitating the use of relatively flat gain profiles in system amplifiers can reduce multi-path interference (MPI). As a result, these techniques facilitate the use of fewer amplifier stages and can, in some cases, loosen requirements of using optical isolators between stages.

The embodiment depicted in FIG. 1 addresses inefficiencies of other approaches by selecting at least some of the launch powers of optical signals 15a–15n as a function of a noise property associated with those signals. The phrase "as a function of noise property" refers to selecting the launch power of an input signal with reference to a characteristic of the signal that varies with wavelength and depends on a signal and/or noise property of the system or part of the system. The power of the input signal can be calculated, for example, with respect to a measurement of one or more of an optical signal-to-noise ratio, an electrical signal-to-noise ratio, a bit error rate, a Q-factor, an optical signal power level, an optical signal power slope, an electrical noise level, an optical noise figure, a multi-path interference level, time, amplified spontaneous emission power level, or a level of four wave mixing within the system or any part of the system.

Signal launch powers may be selected to achieve a desired signal or system characteristic of the optical signals, such as a desired noise figure, SNR, bit error rate, and/or Q-factor. The characteristic may be measured, for example, at a receiver 28 at an end of optical link 25, or at an access element coupled to link 25.

Where Raman amplifiers are implemented in an embodiment of FIG. 1, input signals can be launched with a power spectrum that allows the use of two stage Raman amplifiers that maintain MPI levels as low as −20 decibels, −33 decibels, −50 decibels, or better.

It is not necessary that all optical signals 15 have launch powers independently selected as a function of the noise figure. Moreover, even for those wavelength signals having a launch power selected as a function of the noise figure at that wavelength, it is not necessary that each launch power be determined with reference to the same desired signal characteristic. For example, in some cases it may be desirable to select launch powers for one set of optical signals 15 to ensure obtaining a first SNR, while launch powers for another set of optical signals 15 are selected to ensure obtaining a second SNR, different than the first SNR.

This may be advantageous, for example, where some wavelengths are designated as long haul wavelengths, while others are designated for add/drop processing at access elements along link 25. The long haul signals, for example, may require a higher SNR than the signals traversing only a portion of link 25. The launch powers of the long haul signals, therefore, could be determined with reference to one SNR, while launch powers of the other signals are determined with reference to a different SNR.

As another example, some data types may require a first bit error rate, while other data types can be transmitted with a more relaxed bit error rate. Different wavelengths can be designated for carrying different data types subject to different bit error rates. The presence or absence of forward error correction circuitry can also greatly affect the signal to noise ratio required.

Any number of sets of wavelength signals could have their launch powers determined with respect to different signal characteristics, depending on the design criteria of the system.

As a particular example of determining the launch power for a signal, assume that an output SNR (in decibels) equals the difference between an input SNR (in decibels) and the noise figure (in decibels) at the output; or, $SNR_{out}=SNR_{in}-NF$. This relationship assumes that all of the signal to noise ratios are referred to the output of an ideal photo diode (e.g., 100% quantum efficiency) and is valid when the input light has the a shot noise limited signal to noise ratio ($SNR_{in}=SNR_{snl}$). The shot noise limited signal to noise ratio can be represented mathematically as:

$$SNR_{snl}=P_s+10 \log (\lambda/1 \text{ micron})+154.01 \text{ dB}-10 \log (BW/1 \text{ Hz})$$

In that equation, $P_s$ is the launch power of the signal in decibels above one milli-watt (dBm) (which equals 10 log ($P_s$ in milli-watts); $\lambda$ is the wavelength of the signal in microns, and BW is the detection bandwidth used for the given wavelength in Hz. For a given bandwidth and a selected $SNR_{out}$, the launch power can be expressed as:

$$P_s=SNR_{out}+10 \log (BW/1 \text{ Hz})-154.01 \text{ dB}+NF-10 \log (\lambda/1 \text{ micron})$$

or, simplifying that expression:

$$P_s=C+NF-10 \log (\lambda/1 \text{ micron});$$

where C is a constant that depends on the bandwidth (BW) of the amplified signals and the desired output SNR. Thus, for a given bandwidth and a desired SNR, the launch power $P_s$ of each optical signal 15 can be expressed as a function of the noise figure, that function having a small dependence on the wavelength of the signal. For a desired SNR, the signal launch power can be determined based on the noise figure without reference to the ($\lambda/1$ micron) wavelength dependence, resulting in a small variation in the SNR of the system (typically around 0.3 decibels over a bandwidth of 100 nanometers, at around 1550 nanometers). Alternatively, the signal launch powers can be determined as a function of the noise figure and accounting for the wavelength dependence, resulting in a flat SNR.

Given one or more desired signal characteristics, the launch powers of optical signals 15 can be selectively determined through any of a variety of mechanisms. For example, a drive current applied to optical sources generating optical signals 15 could be adjusted. As another example, the temperature of the optical source could be varied to affect its output power or maintain an output wavelength when the drive current has changed. Alternatively, a gain level of an amplifier within or coupled to the transmitter could be selectively controlled to result in a desired launch power.

As another example, optical signals 15 could each be generated at a fixed or constant power level and fixed or variable optical attenuation could be used to adjust signals 15 prior to signals 15 being combined into multiple wavelength signal 16. As another example, variable gain equalizers could be used on multiple wavelength signal 16 to attenuate some wavelengths more than others to result in the desired distribution of launch powers. Still another example of controlling transmitter power involves the controlled use of "dummy light" to adjust the saturation of the amplifiers receiving the signals. In an alternative example, the output power of the transmitter could be adjusted by controlling a bias voltage to an external modulator, so that the high bits (or "1" bits) in a data sequence are selectively transmitted at less than the full transmission level for a high bit. For example, if the high level bits would typically be transmitted at a level corresponding to 5 volts, the modulator could be controlled to transmit those bits at one or more reduced maximum levels. It may be desirable to maintain the extinction ratio within a given range.

A launch power that is selected as a function of the noise figure can be determined initially as a function of the noise figure, and/or may be adjusted from time to time as a function of the noise figure. For example, in some embodiments, signal launch powers are initially selected during system setup by comparing the signal powers with the desired signal characteristic and adjusting the signal launch powers accordingly. In other embodiments, signal launch powers are monitored continuously, periodically, or on a random basis during system operation and adjusted in power depending on the signal characteristic measured at that time. These embodiments can help account for changes in the shape and/or magnitude of the noise figure due to changes in system characteristics over time, such as temperature variations or aging of components and addition/subtraction of channels being communicated.

The signal characteristic used to influence the magnitude of the launch powers of one or more of optical signals 15 can be determined at various locations within system 10. For example, the noise figure for the entire system 10 could be determined at receivers 28a–28n and used for determining launch powers for optical signals 15. Alternatively, the noise figure for a portion of system 10 could be measured at a location along link 25, such as an optical add/drop multiplexer, where one or more optical signals 15 are added or dropped from multiple wavelength signal 16.

This technique is not limited to controlling the launch power of signals generated at transmitters 12 associated with link 25. The technique could also be applied to signals 15 initially launched on one or more other optical links and later combined with multiple wavelength signal 16 on optical link 25. Likewise, this technique could be used on signals 15 launched into link 25 and whose noise property is measured at receivers 28 on other optical links after being dropped from optical link 25.

As discussed above, various of the pre-emphasis techniques described herein can result in reduced total signal power and/or a reduced noise figure. As an additional benefit, these techniques facilitate freedom in design of gain profiles in the multiple stage amplifiers. Because signal launch power can be selected to at least partially address the noise figure issue, gain profiles of the amplifiers can be selected with less regard to maintaining a particular noise figure shape or level. For example, because the signal launch power settings can be adjusted to deal with the noise figure, a single stage amplifier with a flat gain profile or a multiple stage amplifier with flat gain profiles in each stage can be used without requiring excessive signal launch powers. Alternatively, gain profiles in multiple stage amplifiers can be tailored to accomplish other functions, such as reducing the average noise figure of the amplifier or reducing the total pump power used by the amplifier. Various example multiple stage amplifier designs are discussed below with respect to FIGS. 2–11.

Figure 2A:
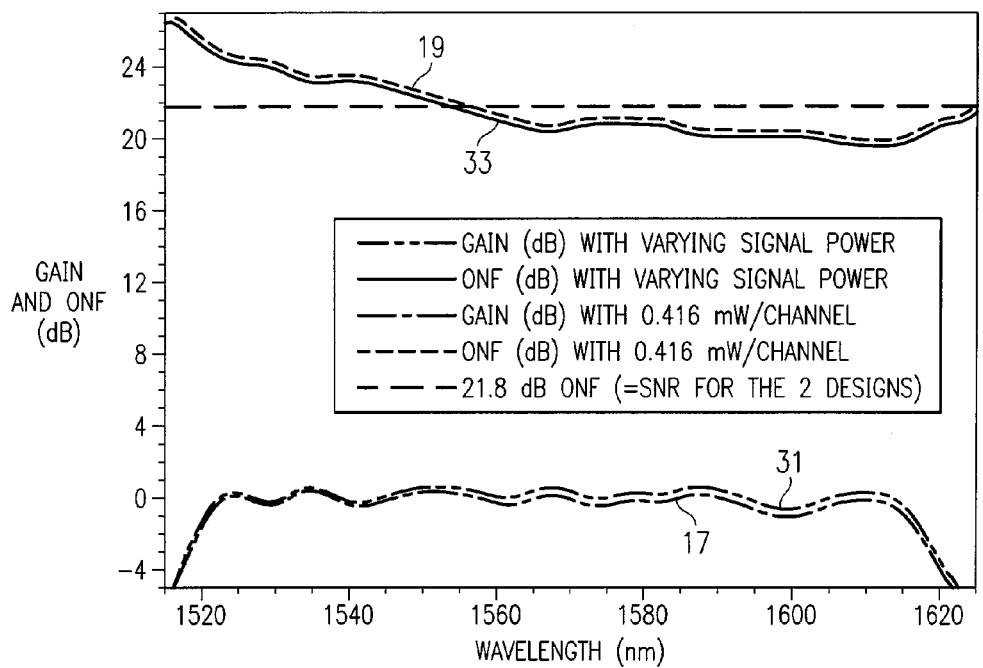
FIGS. 2a–2c are graphs illustrating simulated signal power, signal to noise ratio, gain, and noise figure curves for an example amplifier design implementing approximately flat gain profiles in each amplifier stage.

FIG. 2a is a graph illustrating simulated gain and noise figure curves for a two stage Raman amplifier design implementing approximately flat gain profiles in each amplifier stage. In particular, this simulation assumes a two stage Raman amplifier having a first stage comprising a distributed Raman amplification stage utilizing approximately eighty kilometers of SMF-28 fiber manufactured by Corning, Inc., and a second stage comprising a discrete Raman amplification stage utilizing a length of DK-80 dispersion compensating fiber. The gain profiles for each amplifier stage are substantially flat, simplifying the amplifier design. Table 1 below shows pump wavelength locations and powers for each stage.

TABLE 1

| Flat Profile Two Stage Amplifier Applying 0.416 mW/Channel | | Flat Profile Two Stage Amplifier Applying Varying Signal Power | |
|---|---|---|---|
| Pump λ | Power (W) | Pump λ | Power (W) |
| 80 km SMF-28 | | 80 km SMF-28 | |
| 1396 nm | .56 | 1396 nm | .56 |
| 1416 nm | .56 | 1416 nm | .56 |
| 1427 nm | .56 | 1427 nm | .56 |
| 1455 nm | .25 | 1455 nm | .25 |
| 1472 nm | .1 | 1472 nm | .1 |
| 1505 nm | .085 | 1505 nm | .085 |
| DK-80 | | DK-80 | |
| 1405 nm | .47 | 1405 nm | .47 |
| 1418 nm | .53 | 1418 nm | .53 |
| 1445 nm | .31 | 1445 nm | .31 |
| 1476 nm | .085 | 1476 nm | .085 |
| 1509.5 nm | .025 | 1509.5 nm | .025 |
| Total Pump Power: 3.535 W | | Total Pump Power: 3.535 W | |

This example simulates results for the amplifier in two configurations. In both cases, the total launched signal power among 250 optical signals 15 was 104 milli-watts. In the first configuration, each of optical signals 15 was launched at 0.416 milli-watts. In the second configuration, the total launched power was distributed among the optical signals 15 as a function of the noise figure of the amplifier to achieve an SNR of approximately 33.2 decibels, resulting in higher launched signal powers at shorter wavelengths where the noise figure was larger. In particular, launch powers of optical signals 15 were determined by applying the following equation:

$P_s = -25.6 \text{ dBm} + NF$ (for each signal wavelength).

Note that this equation does not consider the 10 log (λ/1 micron) wavelength dependence. As a result, there will be a slight variation in the SNR as a function of wavelength.

Line 17 in FIG. 2a shows the overall gain curve and line 19 shows the noise figure for the first embodiment (constant launch power). Line 31 in FIG. 2a shows the overall gain curve and line 33 shows the noise figure for the second embodiment (variable launch power). As shown in this figure, varying the signal power as a function of the amplifier noise figure does not result in any significant penalty in terms of peak noise figure or flatness of gain curve. In fact, in this embodiment, varying the launched power as a function of the noise figure results in a lower peak noise figure and an increased gain level.

Figure 2B:
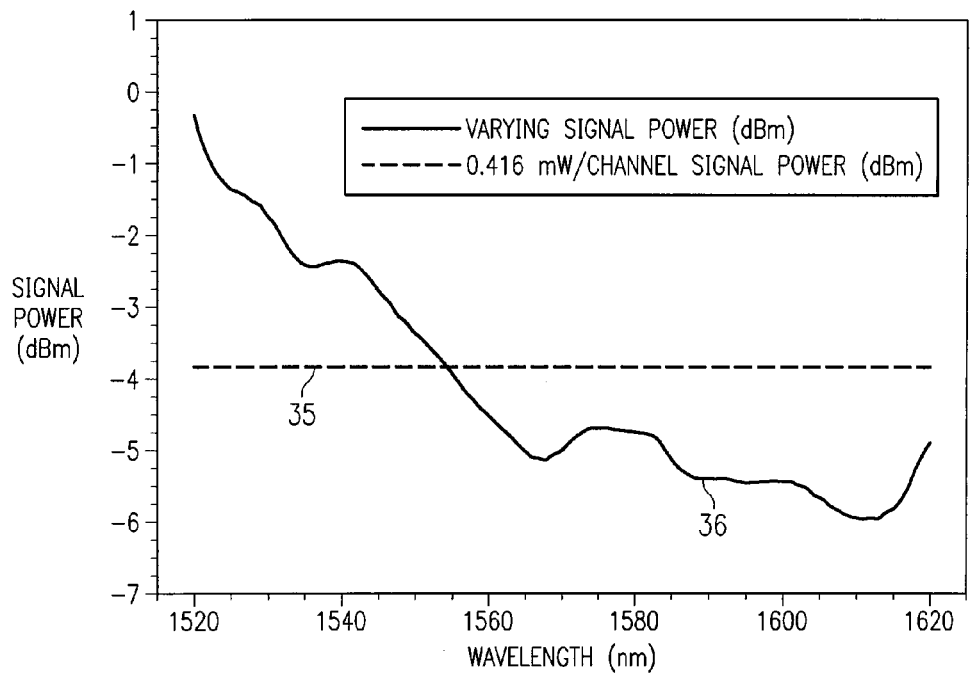

FIG. 2b shows the spectrum of the input signal power for the constant input signal power case 35 and the pre-emphasized signal power case 36. As shown here, the pre-emphasized signal power case 36 results in a signal spectrum having primarily decreasing input power levels with increasing wavelengths of the plurality of optical signals.

The lower peak noise figure shown in FIG. 2a results, at least in part, from the negatively sloped signal spectrum 36. Increasing the input powers to shorter wavelength signals and reducing the powers to the longer wavelength signals has a two-fold effect. First, lower powered longer wavelength signals can be used because those signals can benefit from increased constructive signal-to-signal interaction in light of the higher powered shorter wavelength signals. Second, lower powered longer wavelength signals allow the use of lower powered pumps supporting these wavelengths. Using lower powered pumps at the longest pump wavelength signals (the pump signals often closest to the signals being amplified), reduces thermally induced noise to the shorter wavelength optical signals. Thus, implementing a primarily negatively sloped input signal spectrum can reduce the system power requirements, as well as the system noise figure.

Figure 2C:
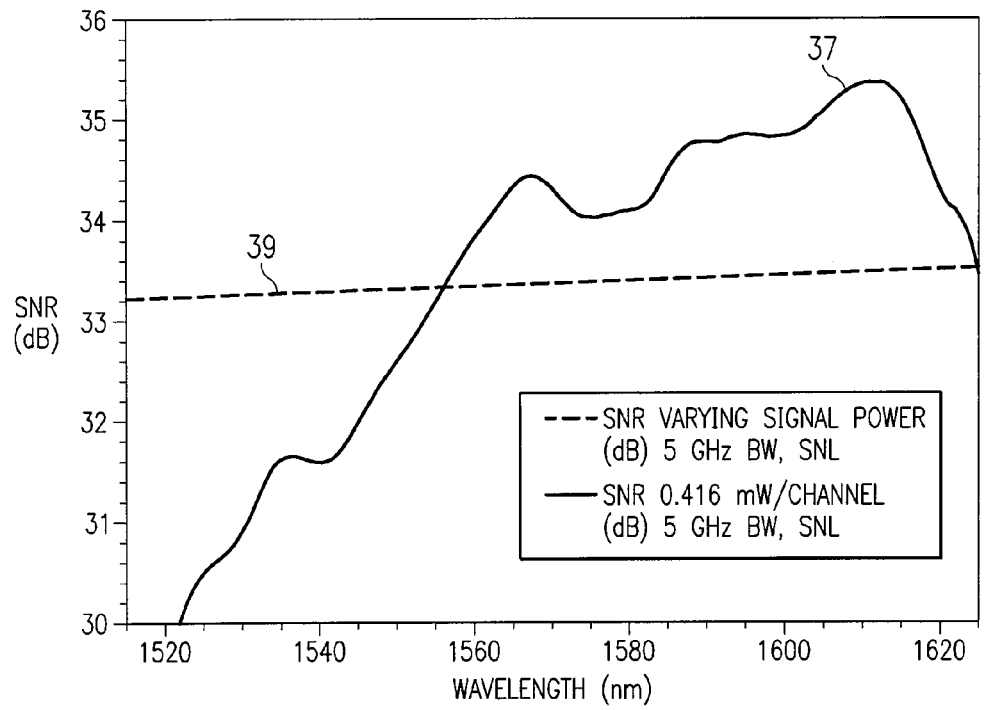

FIG. 2c is a graph showing the SNR resulting from the simulations shown in FIG. 2a and assuming a receiver detection bandwidth of 5 gigahertz. In particular, line 37 shows the SNR for the constant launch power embodiment, while line 39 shows the SNR for the variable launch power embodiment. As shown in this figure, the variable launch power embodiment results in an approximately flat SNR across the amplified bandwidth, varying by about 0.3 decibels from 1515 nanometers to 1625 nanometers. This results primarily from the fact that the launch powers of optical signals 15 were selected based on the noise figure at each wavelength.

The slight variation in SNR 39 (the varying launch power embodiment) results from the slight wavelength dependence of the SNR, which was not considered in determining launch powers in this example. In another embodiment, signal powers could be selected based on a combination of the variation in the noise figure and the center wavelength of the signal 15, to result in a completely flat SNR.

The constant launch power embodiment shows a significantly varying SNR 37 over the bandwidth of amplified wavelengths, varying by over five decibels. This results because the signal launch powers remain constant while the noise figure varies as a function of wavelength. Because the launch power remained constant in that embodiment, SNR 37 is lowest where the noise figure is the highest.

At those wavelengths, SNR 37 is significantly below SNR 39. For example, at approximately 1522 nanometers, the SNR 39 for the variable launch power embodiment is more than three decibels higher than the SNR 37 for the constant launch power embodiment. If one were to use a constant launch power embodiment and require an SNR equal to that of the variable launch power embodiment across the entire amplified bandwidth, it would be necessary to increase the launch power of all optical signals 15 by more than three decibels in the constant launch power embodiment. This results in inefficiency because launch powers would be increased unnecessarily where the noise figure is low. The variable launch power embodiment, therefore, can result in efficiencies over a constant launch power approach.

Figure 3A:
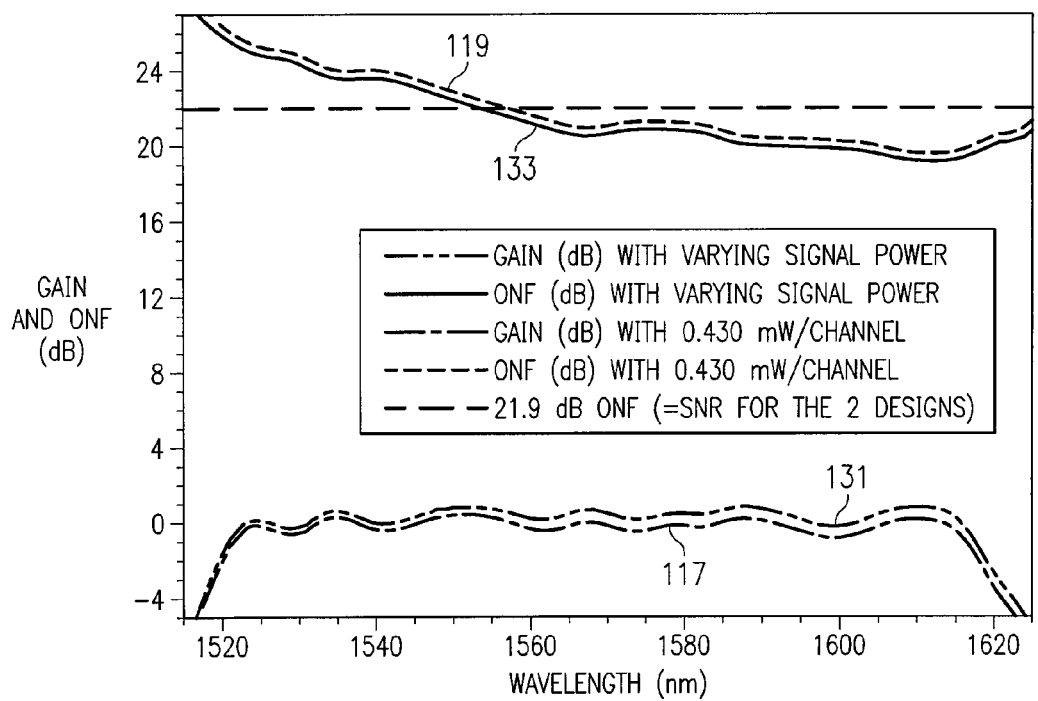
FIGS. 3a–3c are graphs illustrating simulated signal power, signal to noise ratio, gain, and noise figure curves for another example amplifier design implementing approximately flat gain profiles in each amplifier stage.

FIG. 3a is a graph illustrating simulated gain and noise figure curves for another embodiment of a two stage Raman amplifier design implementing approximately flat gain profiles in each amplifier stage. In particular, this simulation assumes a two stage Raman amplifier having a first stage comprising a distributed Raman amplification stage utilizing approximately eighty kilometers of non-zero dispersion shifted fiber (NZDSF), and a second stage comprising a discrete Raman amplification stage utilizing a length of DK-80 dispersion compensating fiber. The gain profiles for each amplifier stage are substantially flat. Table 2 below shows pump wavelength locations and powers for each stage.

TABLE 2

| Flat Profile Two Stage Amplifier Applying 0.430 mW/Channel | | Flat Profile Two Stage Amplifier Applying Varying Signal Power | |
|---|---|---|---|
| Pump λ | Power (W) | Pump λ | Power (W) |
| 80 km NZDSF | | 80 km NZDSF | |
| 1396 nm | .343 | 1396 nm | .343 |
| 1416 nm | .343 | 1416 nm | .343 |
| 1427 nm | .343 | 1427 nm | .343 |
| 1455 nm | .153 | 1455 nm | .153 |
| 1472 nm | .0612 | 1472 nm | .0612 |
| 1505 nm | .052 | 1505 nm | .052 |
| DK-80 | | DK-80 | |
| 1405 nm | .47 | 1405 nm | .47 |
| 1418 nm | .55 | 1418 nm | .55 |
| 1445 nm | .33 | 1445 nm | .33 |
| 1476 nm | .083 | 1476 nm | .083 |
| 1509.5 nm | .023 | 1509.5 nm | .023 |
| Total Pump Power: 2.7512 W | | Total Pump Power: 2.7512 W | |

This example simulates results for the amplifier in two configurations. In both cases, the total launched signal power among 250 optical signals 15 was approximately 107 milli-watts. In the first configuration, each of optical signals 15 was launched at 0.430 milli-watts. In the second configuration, the total launched power was distributed among the optical signals 15 as a function of the noise figure of the amplifier to achieve an SNR of approximately 33.2 decibels, resulting in higher launched signal powers at shorter wavelengths where the noise figure was larger. In particular, launch powers of optical signals 15 were determined by applying the following equation:

$$P_s = -25.6 \text{ dBm} + NF.$$

Line 117 in FIG. 3a shows the overall gain curve and line 119 shows the noise figure for the first embodiment (constant launch power). Line 131 in FIG. 3a shows the overall gain curve and line 133 shows the noise figure for the second embodiment (variable launch power). As shown in this figure, varying the signal power as a function of the amplifier noise figure does not result in any significant penalty in terms of peak noise figure or flatness of gain curve, but rather results in a lower peak noise figure and an increased gain level.

Figure 3B:
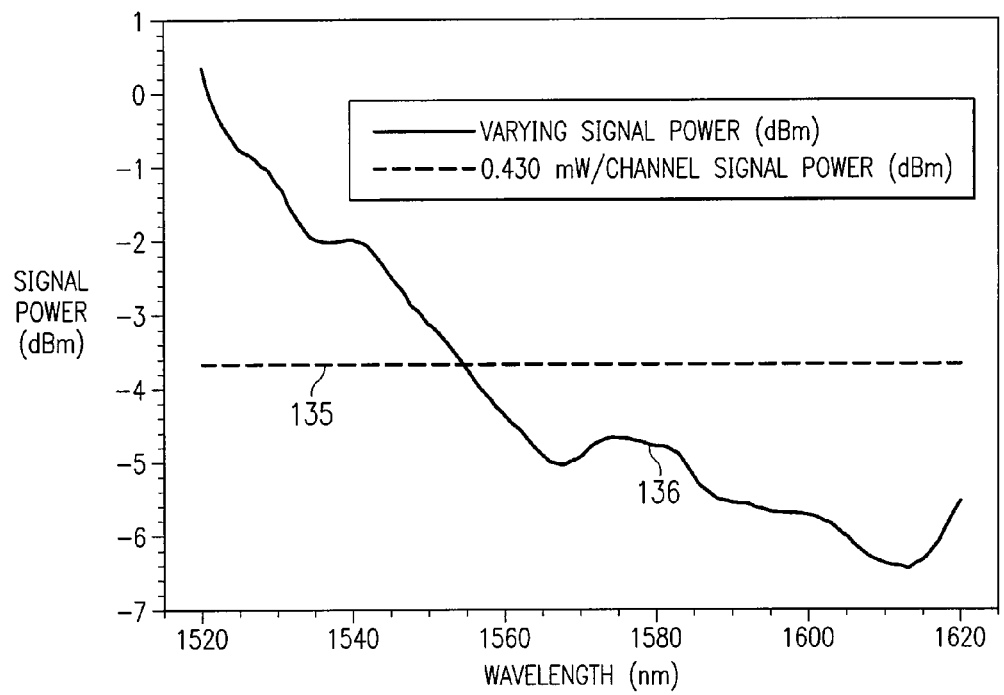

FIG. 3b shows the spectrum of the input signal power for the constant input signal power case 135 and the pre-emphasized signal power case 136. As shown here, the pre-emphasized signal power case 136 results in a signal spectrum having a primarily negative slope as wavelengths increase.

Figure 3C:
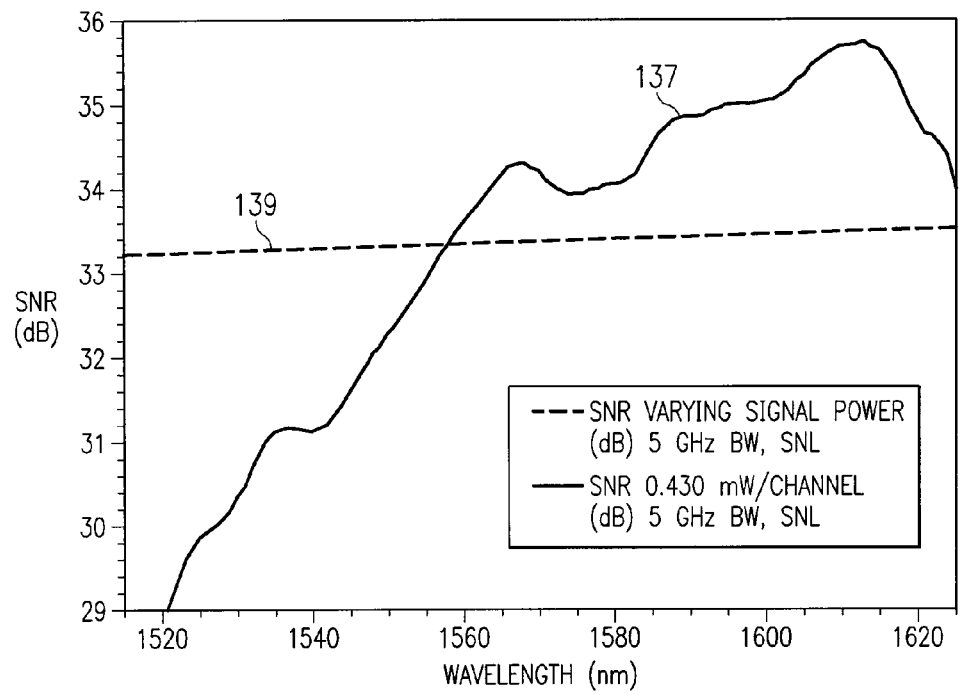

FIG. 3c is a graph showing the SNR resulting from the simulations shown in FIG. 3a and assuming a receiver detection bandwidth of 5 gigahertz. In particular, line 137 shows the SNR for the constant launch power embodiment, while line 139 shows the SNR for the variable launch power embodiment. Again, the variable launch power embodiment results in an approximately flat SNR 139 across the amplified bandwidth, in this case varying by approximately 0.3 decibels from 1515 nanometers to 1625 nanometers. Again, in this example, signal launch powers were selected without reference to the wavelength dependence of the SNR resulting in a slight variation in the SNR. Accounting for this wavelength dependence can result in a completely flat SNR.

The constant launch power embodiment shows a significantly varying SNR 137 over the bandwidth of amplified wavelengths, varying by more than six decibels. Because the launch power remained constant in that embodiment, SNR 137 is lowest where the noise figure is the highest. At those wavelengths, SNR 137 is significantly below SNR 139. For example, at approximately 1522 nanometers, the SNR 139 for the variable launch power embodiment is nearly four decibels higher than the SNR 137 for the constant launch power embodiment. To use a constant launch power embodiment and ensure an SNR equal to that of the variable launch power embodiment across the entire amplified bandwidth, it would be necessary to increase the launch power of all optical signals 15 by nearly four decibels, resulting in significant additional launch power.

Although FIGS. 2 and 3 were described with respect to a Raman amplification system, similar results can be obtained using any amplifier type. The examples described herein with respect to Raman amplification systems are presented for illustrative purposes only.

As discussed above, varying signal launch powers as a function of a noise property of all or a portion of the system provides an advantage of allowing the use of flat gain profiles in the amplifiers. This facilitates simplification of amplifier design and can result in more inexpensive amplifiers. At the same time, this approach ensures a desired SNR without requiring excessive launch powers across all amplified wavelengths.

As further indicated above, addressing the noise figure issue through varying launch powers allows freedom of design in amplifier gain profiles to address various design concerns. Using launch powers that vary with wavelength, multiple stage amplifiers can implement gain profiles in each amplification stage that are tailored to bring about particular desirable results. For example, gain profiles can be selected to reduce the average noise figure of the amplifier, or to reduce the pump power required to provide a particular gain.

Figure 4A:
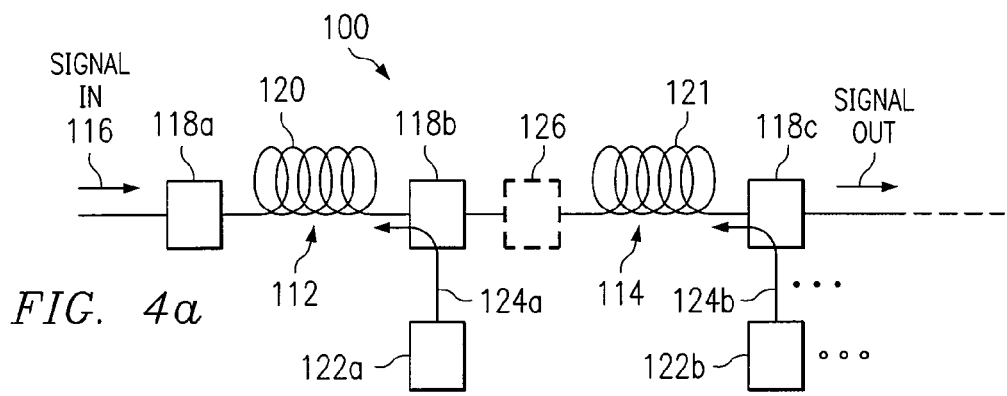
FIGS. 4a–4c illustrate an exemplary embodiment of a multiple stage amplifier including at least two amplification stages, gain profiles associated with various amplification stages of the amplifier, and an overall gain profile for the amplifier, respectively.
Figure 4B:
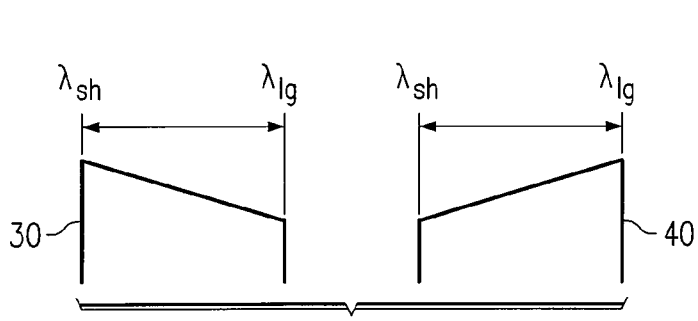
Figure 4C:
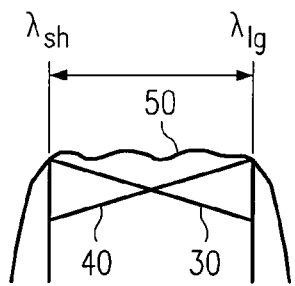

FIGS. 4a–4c illustrate an exemplary embodiment of a multiple stage amplifier 100 including gain profiles 30 and 40 associated with various amplification stages and an overall gain profile 50 for the amplifier. The embodiment shown in FIG. 4a provides an example of a multiple stage amplifier 100 receiving variable launch power signals and implementing non-flat gain profiles in at least some stages to reduce the peak noise figure of the amplifier. By reducing the peak noise figure, amplifier 100 facilitates reducing the launch power needed to achieve a given SNR even where the signal launch powers are held constant across the amplification bandwidth. Reducing the signal launch power reduces stress on system components and reduces pump powers needed to generate the correspondingly lower powered output signals.

While the examples described with respect to FIGS. 2 and 3 comprise multiple stage amplifiers having approximately flat gain profiles in each stage, the amplifiers depicted in FIG. 4 comprises multiple amplification stages having varying gain profiles, which are approximately complimentary to one another.

Throughout this description, the phrase "approximately complementary" refers to a situation where, at least in general, wavelength signals that are highly amplified in the first stage are less amplified in the second stage, and wavelength signals that are highly amplified in the second stage are less amplified in the first stage. Two gain profiles said to be "approximately complementary" need not have equal and opposite slopes. Moreover, equal amplification of any particular wavelengths in both gain profiles does preclude those gain profiles from being "approximately complementary."

Approximately complementary gain profiles may have one or more slopes associated with each gain profile. For example, approximately complementary gain profiles could comprise a "W" shaped profile followed by an "M" shaped profile, or an "M" shaped profile followed by a "W" shaped profile. Furthermore, the approximately complementary gain profiles may become approximately complementary only after traversing all or a portion of the transmission medium. In those cases, the gain profiles launched at the beginning of the amplifier stage may not be approximately complementary, but may become approximately complementary after signals traverse all or a portion of the transmission medium.

While best results are obtained by applying approximately complimentary gain profiles to all or nearly all of the same signal wavelengths, some portion of wavelengths can be omitted from one gain profile and included in the other gain profile without departing from the scope of this invention.

Conventional designs of multi-stage amplifiers have experienced difficulties processing bandwidths in excess of 80 nanometers while maintaining approximately flat gain profiles and acceptable noise figures. For example, in Raman amplifiers, a major culprit in noise figures is the phonon-stimulated optical noise created when wavelength signals being amplified reside spectrally close to pump wavelengths used for amplification. The embodiment shown in FIG. 4a reduces adverse effect of this noise by enhancing the Raman amplification of signal wavelengths near the pump wavelengths to overcome the effects of the noise, and applying an approximately complementary gain profile in another stage to result in an approximately flat overall gain profile with a reduced noise figure.

In this example, amplifier 100 comprises a two-stage amplifier having a first stage 112 and a second stage 114 cascaded with first stage 112. There is no limit to a particular number of amplifier stages. For example, additional amplification stages could be cascaded onto second stage 114. Moreover, although the illustrated embodiment shows second stage 114 cascaded directly to first stage 112, additional amplification stages could reside between first stage 112 and second stage 114 without departing from the scope of the invention.

Amplifier 100 could comprise a distributed Raman amplifier, a discrete Raman amplifier, a hybrid Raman amplifier which comprises both discrete and distributed stages, a rare earth doped amplifier, a semiconductor amplifier, or another amplifier type or combination of amplifier types. Each stage 112, 114 of amplifier 100 includes an input operable to receive a multiple wavelength optical input signal 116. As a particular example, signal 116 could include wavelengths ranging over one hundred nanometers.

Each stage 112, 114 also includes a gain medium 120, 121. Depending on the type of amplifier being implemented, media 120, 121 may comprise, for example a gain fiber or a transmission fiber. In a particular embodiment, media 120, 121 may comprise dispersion compensating fibers.

Each stage 112, 114 further includes one or more wavelength pumps 122. Pumps 122 generate pump light 124 at specified wavelengths, which are pumped into gain media 120, 121. Pumps 122 may comprise, for example, one or more laser diodes. Although the illustrated embodiment shows the use of counter propagating pumps, under at least some circumstances using a relatively quiet pump, co-propagating pumps could also be used without departing from the scope of the invention.

In one particular embodiment, pump wavelengths 124 can be selected so that the longest wavelength pump signal 124 has a wavelength that is shorter than the shortest wavelength of signal 116. As one specific example, the longest wavelength of pump light 124 could be selected to be, for example, at least ten nanometers shorter than the shortest wavelength of signal 116. In this manner, amplifier 100 can help to avoid phonon stimulated noise that otherwise occurs when pump wavelengths interact with wavelengths of the amplified signal.

Couplers 118b and 118c couple pump wavelengths 124a and 124b to gain media 120 and 125, respectively. Couplers 118 could comprise, for example, wavelength division multiplexers or optical couplers. A lossy element 126 can optionally reside between amplifier stages 112 and 114. Lossy element 126 could comprise, for example, an isolator, an optical add/drop multiplexer, or a gain equalizer.

The number of pump wavelengths 124, their launch powers, their spectral and spatial positions with respect to other pump wavelengths and other wavelength signals, and the bandwidth and power level of the signal being amplified can all contribute to the shape of the gain profile for the respective amplifier stage.

FIG. 4b shows exemplary gain profiles for first stage 112 and second stage 114. Gain profile 30 shows the overall gain of first stage 112 of amplifier 100 for a bandwidth ranging from the shortest wavelength of signal 116 ($\lambda_{sh}$) to the longest wavelength of signal 116 ($\lambda_{lg}$). Gain profile 40 shows the overall gain of second stage 112 of amplifier 100 for a bandwidth ranging from the shortest wavelength of signal 116 ($\lambda_{sh}$) to the longest wavelength of signal 116 ($\lambda_{lg}$). Each of gain profiles 30 and 40 reflects the effects of the other gain profile acting upon it.

In this example, gain profile 30 of first stage 112 has primarily a downward slope, where a majority of the shorter signal wavelengths 116 are amplified more than a majority of the longer signal wavelengths 116. Conversely, gain profile 40 of second stage 114 is approximately complimentary to gain profile 30 of first stage 112. Gain profile 40 exhibits primarily an upward slope where a majority of the longer signal wavelengths 116 are amplified more than a majority of the shorter signal wavelengths 116.

Although gain profiles 30 and 40 are for simplicity depicted as each having substantially one slope, the slope of each gain profile may change numerous times. Moreover, it is not necessary that the entire slope of gain profile 30 be negative, or that the entire slope of gain profile 40 be positive. Each profile may exhibit any number of peaks and valleys over the amplified bandwidth.

Gain profile 50 (shown in dotted lines in FIG. 4c) represents an exemplary overall gain profile of amplifier 100 resulting from the application of gain profiles 30 and 40 to signal 116. Overall gain profile 50 is approximately flat over at least substantially all of the bandwidth of wavelengths within signal 116.

This particular example provides a significant advantage in reducing the peak noise figure associated with the amplifier using complementary gain profiles. The complementary gain profiles reduce the peak noise figure by amplifying signals closest to the pump wavelengths at higher levels the signals at wavelengths far from the pump wavelengths. In addition, the noise figure is reduced by amplifying longer wavelength signals in a later amplifier stage. Moreover, implementing varying launch powers reduces the total launched signal power, which, in Raman amplifiers, reduces noise generated from the signal-signal interactions and also reduces other non-linear effects such as self phase modulation. In a discrete amplifier embodiment, using this type of configuration, the noise figure of amplifier 100 in the small signal limit can be reduced to less than eight decibels, in some cases 7 decibels, even where the bandwidth of signal 16 exceeds 100 nanometers.

Complementary gain profiles can also be used to reduce the pump power requirements for a given amplifier. When this technique is combined with a technique of varying signal launch powers as a function of the noise figure, a high efficiency system can result, which uses relatively lower total pump power and relatively lower total signal launch power.

Figure 5A:
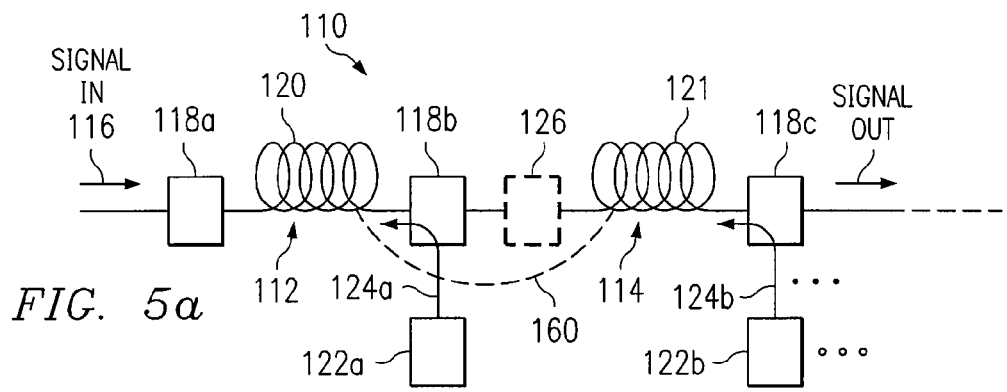
FIGS. 5a–5c illustrate another exemplary embodiment of a multiple stage amplifier including at least two amplification stages, gain profiles associated with various amplification stages of the amplifier, and an overall gain profile for the amplifier, respectively.
Figure 5B:
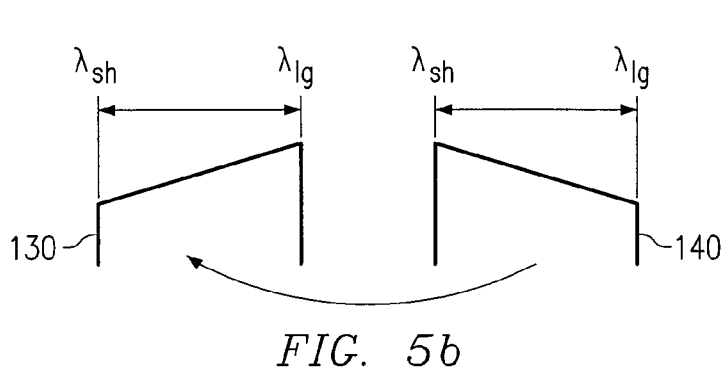
Figure 5C:
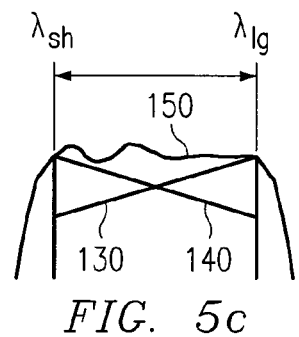

FIGS. 5a–5c illustrate a high pump efficiency embodiment of a multiple stage amplifier 110 including exemplary gain profiles 130 and 140 associated with various amplification stages and an overall gain profile 150 for the amplifier. Amplifier 110 shown in FIG. 5a is similar in structure and function to amplifier 100 shown in FIG. 4a. Like amplifier 100 shown in FIG. 4a, amplifier 110 of FIG. 5a includes a first amplification stage 112 and a second amplification stage 114. Each of stages 112 and 114 includes a gain medium 120, 121, respectively, which is operable to receive multiple wavelength input signal 116 and pump wavelengths 124a and 124b, respectively. Each amplifier stage 112 and 114 operates to amplify wavelengths of signal 116 according to gain profiles 130 and 140 as shown. In this example, at least first stage 112 comprises a Raman amplification stage. Second stage 114 could comprise a Raman amplification stage, or another type of amplification stage.

The example shown in FIG. 5 differs from the example shown in FIG. 4 in that gain profile 130 (shown in FIG. 5b) of first stage 112 exhibits primarily an upward slope where a majority of longer wavelengths of signal 116 are amplified more than the majority of shorter wavelengths of signal 116. Conversely, gain profile 140 of second stage 114 comprises an approximately complementary gain profile to first gain profile 130 of first stage 112. Profile 140 applies a higher gain to a majority of shorter wavelengths than the gain applied to the majority of longer signal wavelengths 116. In addition, in this embodiment, the power of pumps 122a driving first gain profile 130 can be reduced.

The Raman scattering effect transfers energy from shorter wavelength signals to longer wavelength signals. This embodiment leverages that fact to allow the longer pump wavelengths of Raman first stage 112 to accept energy from the shorter pump wavelengths of second stage. In a particular embodiment, amplifier 110 may include a shunt 160 between second gain medium 121 and first gain medium 120 to facilitate the longer pump wavelengths of first stage 112 accepting power from the shorter pump wavelengths of second stage 114. The combined effects of first stage 112 and second stage 114 result in an overall gain profile 150 (FIG. 5c) of the amplifier that remains approximately flat.

This embodiment provides significant advantages in terms of efficiency by allowing the use of fewer wavelength pumps 122a in the first stage 112, and/or also by allowing each pump 122a to operate at a lower launch power. By selecting signal launch powers as a function of the noise figure of the amplifier, this embodiment enjoys the further efficiency of reduced overall launched signal power.

The embodiment shown in FIG. 5a can also provide improvements for the noise figure of the amplifier. For example, phonon stimulated noise is created in Raman amplifiers where wavelengths being amplified spectrally reside close to a wavelength of pump signals 124. By spectrally separating pump wavelengths 124 from signal wavelengths 116, phonon stimulated noise can be reduced.

In a particular embodiment, pump wavelengths 124 are selected to have wavelengths at least 10 nanometers shorter than the shortest wavelength in signal 116 being amplified. Moreover, in a particular embodiment, second stage 114, where a majority of the gain to short wavelengths of signal 116 is applied, comprises the last stage of amplifier 110.

Although the embodiments shown in FIGS. 4–5 show two complementary amplification stages, additional complementary amplification stages could also be implemented.

Figure 6A:
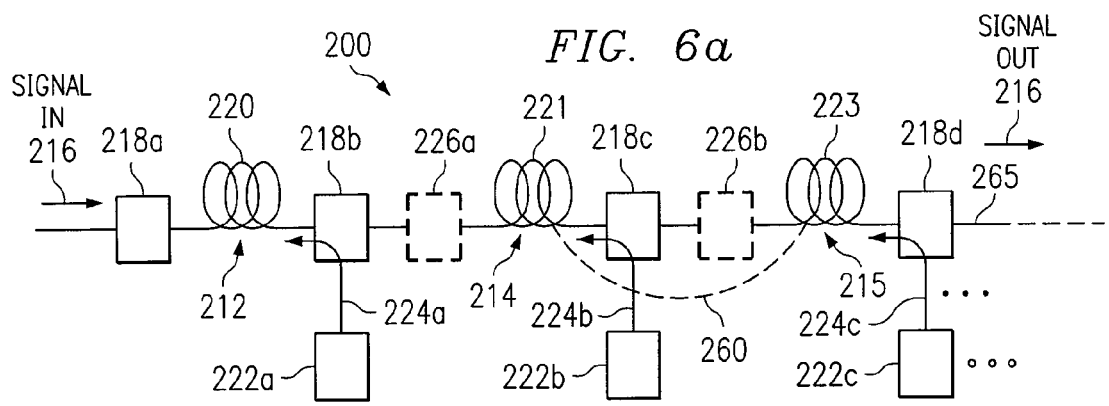
FIGS. 6a–6c illustrate another exemplary embodiment of a multiple stage amplifier including at least three amplification stages, gain profiles associated with various amplification stages of the amplifier, and an overall gain profile for the amplifier, respectively.
Figure 6B:
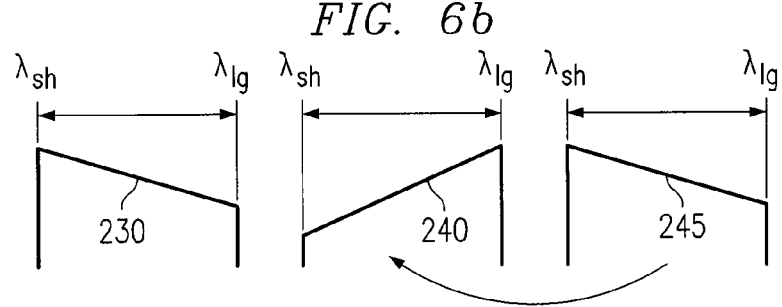
Figure 6C:
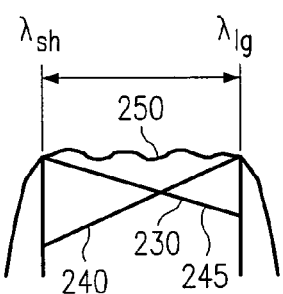

FIG. 6a is a block diagram of a three stage amplifier 200 including gain profiles 230, 240, and 245 associated with various amplification stages, and an overall gain profile 250 for the amplifier. Amplifier 200 is similar in structure and function to amplifier 100 of FIG. 4 but includes three cascaded amplification stages 212, 214, and 215. Each of amplifier stages 212–215 includes a gain medium 220, 221, 223, respectively, which operates to receive multiple wavelength signal 216 and pump wavelengths 224a–224c from pumps 222a–222c. At least second amplifier stage 214 comprises a Raman amplification stage. Each amplifier stage includes an optical coupler operable to introduce pump wavelengths 224 to the respective gain media. In some embodiments, lossy elements 226 may reside between one or more amplification stages 212–215. Lossy elements 226 may comprise, for example, optical add/drop multiplexers, isolators, and/or gain equalizers.

In this particular example, first stage 212 and second stage 214 operate in a similar manner to amplifier 100 shown in FIG. 4a. In particular, first stage 212 applies a gain profile 230 that amplifies a majority of shorter signal wavelengths 216 more than it amplifies a majority of longer signal wavelengths 216. Second stage 214, conversely, applies and approximately complementary gain profile 240 to signal 216, where the majority of longer wavelengths of signal 216 are amplified more than a majority of shorter wavelengths of signal 216.

The combination of second stage 214 and third stage 215, on the other hand, operates similarly to amplifier 110 shown in FIG. 5a. While second stage 214 applies gain profile 240 amplifying a majority of longer signal wavelengths 216 more than a majority of shorter signal wavelengths 216, third stage 215 applies to gain profile 245, which amplifies a majority of shorter signal wavelengths 216 more than a majority of longer signal wavelengths 216. The composite gain profile 250 (shown in FIG. 6c) resulting from the combination of amplifications in first, second, and third amplifier stages of amplifier 200 results in an approximately flat overall gain profile for the amplifier.

This particular example reaps the efficiency benefits discussed with respect to FIG. 5, and permits use of the noise figure reduction techniques discussed with respect to FIGS. 4 and 5. For example, efficiency advantages are realized by allowing longer pump wavelengths 224b of second stage 214 to accept power from high powered shorter pump wavelengths 224c of third amplification stage 215. This results from the Raman effect wherein longer wavelength signals accept energy from shorter wavelength signals. As a result, second stage 214 can be operated with fewer wavelength pumps than what otherwise be required, and also with lower pump launch powers.

In terms of improvements in noise figure, the gain profiles of first stage 212 compared to second stage 214 result in high amplification of shorter wavelengths of signal 216 to overcome phonon stimulated noise associated with interaction of those signals with the longer pump wavelengths 224a. In addition, providing a significant amount of amplification to shorter wavelengths of signal 216 in the last stage 215 of amplifier 220 helps to minimize the noise figure associated with amplifier 200.

Moreover, applying varied signal launch powers depending at least in part on the noise figure of the amplifier results in reducing the total signal launch power, further increasing the efficiency of the system.

FIGS. 7a–7c illustrate a four stage amplifier, gain profiles associated with various stages of the amplifier, and a composite gain of the amplifier respectively. In this example, amplifier 300 includes four amplification stages 312, 314, 315, and 317. At least third stage 315 comprises a Raman amplification stage.

As shown in FIG. 7b, first stage 312 applies a gain profile 330 where a majority of shorter signal wavelengths are amplified more than a majority of longer signal wavelengths, and second stage 314 applies an approximately complimentary gain profile 335 where a majority of longer signal wavelengths are amplified more than a majority of shorter signal wavelengths. In this particular embodiment, the composite gain from first stage 312 and second stage 314 results in an approximately flat overall gain profile at the output of second stage 314.

Because the composite gain curve for the amplifier is approximately flat, this design advantageously facilitates addition and subtraction of particular wavelengths of signal 316 without the need for further manipulation of the gain. In addition, first and second gain stages 312 and 314 provide a low noise figure, reducing the effects of phonon stimulated noise in shorter wavelength signals closest to the pump wavelengths.

Particular wavelengths of signal 316 may be substituted with other wavelengths at access element 326b. After processing by access element 326b, signal 316 continues to third amplification stage 315, where gain profile 340 is applied as shown in FIG. 7b. Signal 316 is then communicated to fourth stage 317 where gain profile 345 is applied to wavelengths of signal 316. Amplified signal 316 is then output at output port 365.

Third and fourth amplification stages of amplifier 300 are similar in structure and function to amplifier 110 described with respect to FIG. 5. Through the use of this configuration, third and fourth amplifier stages 315 and 317 provide increased efficiency in operation. In particular, pump 322 can operate with fewer pump signals and/or lower pump power as a result of the Raman scattering effect which allows longer pump wavelengths 324c of Raman third stage 315 to accept power from shorter pump wavelengths 324d of fourth amplification stage 317. Moreover, third and fourth amplification stages 315 and 317 assist in maintaining a low noise figure by applying a significant amount of the gain to the shortest wavelengths of signal 316 at the last amplifier stage 317.

As in other embodiments, applying varied signal launch powers depending at least in part on the noise figure of the amplifier results in reducing the total signal launch power, further increasing the efficiency of the system.

Amplifiers depicted in FIGS. 4–7 and 11 can comprises wide band amplifiers operable to receive and amplify a wide bandwidth of multiple wavelength signal 16. In particular embodiments, the amplifiers can process over 80 nanometers of bandwidth, and in some cases over 100 nanometers of bandwidth while maintaining an approximately flat overall gain profile over the bandwidth of amplified signal wavelengths 16.

Throughout this document, the term "approximately flat overall gain profile" describes a condition where the maximum signal gain at the output of the amplifier differs from the minimum signal gain at the output of the amplifier by an no more than amount suitable for use in telecommunication systems over an operational bandwidth of information carrying channels. Deviation of the maximum and minimum signal gain over one or two of several channels is not intended to be outside of the scope of an approximately flat overall gain profile. The deviation between minimum and maximum signal gains may comprise, for example five decibels prior to application of any gain flattening filters over an operational bandwidth of, for example, 40 nanometers or more. Particular embodiments of the invention may achieve gain flatness of approximately three decibels or less prior to application of any gain flattening filters over an operational bandwidth.

Implementing launch signal powers that vary with wavelength according to a noise figure associated with at least part of the system, in combination with various amplifier gain profiles, provides significant freedom in designing wide bandwidth amplifiers. As discussed above, varying signal launch powers can be combined with flat gain profile amplifiers to provide a simple amplifier design, which ensures a desired SNR, while minimizing the total launched signal power. In other embodiments, signal launch powers that vary with wavelength with the noise figure can be combined with more complex amplifier designs having sloped gain profiles in multiple amplifier stages. Combining varying signal power with these techniques can result in lower noise figures, or can provide a more efficient amplifier design, reducing both the launched signal power and the pump power required by the amplifier.

Figure 8:
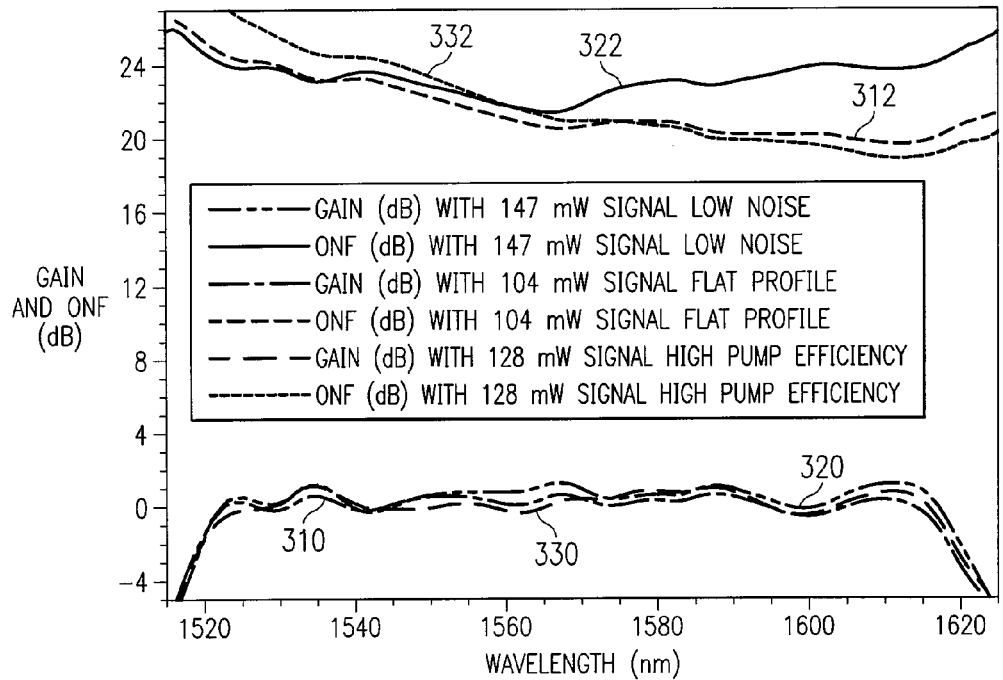
FIG. 8 is a graph illustrating simulated results of one particular amplifier design implementing various combinations of gain profiles.

FIG. 8 is a graph illustrating simulated results of one particular amplifier design implementing various combinations of gain profiles. This example assumes a two stage Raman amplifier comprising a distributed Raman amplification stage followed by a discrete Raman amplification stage. The distributed Raman amplification stage implements approximately eighty kilometers of SMF-28 fiber, while the discrete Raman amplification stage implements a length of DK-80 dispersion compensating fiber.

In all cases, the launched signal power of each wavelength signal is varied depending on the noise figure of the amplifier to achieve an SNR equivalent to a system with one milli-watt per channel of signal power and a flat noise figure of 25.6 decibels (approximately 33.2 decibels with a 5 gigahertz detection bandwidth at 1520 nanometers). The varied launched signal power is applied to the amplifier in three configurations. The first configuration is one where the gain profiles of the amplification stages are approximately flat. This will be referred to as the "flat profile configuration."

A second configuration implements approximately complementary gain profiles in the first and second amplification stages, similar to those shown in FIG. 4b. This will be referred to as the "low noise configuration."

A third configuration implements approximately complementary gain profiles in the first and second amplification stages similar to those shown in FIG. 5b. This will be referred to as the "high pump efficiency configuration."

Table 3 below shows the pump wavelengths and powers applied in each amplification stage.

TABLE 3

| LOW NOISE Applying 147 mW Total Signal Power Varying By Wavelength | | FLAT PROFILE Applying 104 mW Total Signal Power Varying By Wavelength | | HIGH PUMP EFF. Applying 128 mW Total Signal Power Varying By Wavelength | |
|---|---|---|---|---|---|
| Pump λ | Power | Pump λ | Power | Pump λ | Power |
| 80 km SMF-28 | | 80 km SMF-28 | | 80 km SMF-28 | |
| 1396 nm | .56 | 1396 nm | .56 | 1396 nm | .56 |
| 1416 nm | .56 | 1416 nm | .56 | 1427 nm | .56 |
| 1427 nm | .56 | 1427 nm | .56 | 1455 nm | .25 |
| 1455 nm | .2 | 1455 nm | .25 | 1472 nm | .15 |
| 1472 nm | .08 | 1472 nm | .1 | 1505 nm | .25 |
| 1505 nm | .023 | 1505 nm | .085 | DK-80 | |
| DK-80 | | DK-80 | | 1396 nm | .56 |
| 1405 nm | .56 | 1405 nm | .47 | 1416 nm | .56 |
| 1418 nm | .56 | 1418 nm | .53 | 1427 nm | .22 |
| 1445 nm | .4 | 1445 nm | .31 | 1445 nm | .22 |
| 1476 nm | .16 | 1476 nm | .085 | 1476 nm | .04 |
| 1509.5 nm | .063 | 1509.5 nm | .025 | 1509.5 nm | .0107 |
| Total Pump Power: 3.726 W | | Total Pump Power: 3.535 W | | Total Pump Power: 3.3807 W | |

Line 310 represents the gain curve for the flat profile configuration, while line 312 represents the noise figure for the flat profile configuration. Line 320 represents the gain curve for the low noise configuration, while line 322 represents the noise figure for that configuration. Line 330 represents the gain curve for the high pump efficiency configuration, while line 332 represents the noise figure for that configuration.

As can be appreciated from FIG. 8, the low noise configuration enjoys the lowest peak noise figure. This is due at least in part to the complementary gain profiles used, which provides higher amplification to the wavelength signals closest in wavelength to the pump wavelengths, thus overcoming phonon induced noise. The low noise configuration, however in this example, utilizes the most total pump power and the most total launched signal power.

The flat profile configuration experiences a slightly higher peak noise figure, but enjoys the lowest average noise figure. In addition, the flat profile configuration utilizes less pump power than the low noise configuration and uses the least launched signal power of any of these examples. The reduced launched signal power reduces the signal-signal interactions, which results in a lower average noise figure for the amplifier. Moreover, the noise figure, and thus signal power, being highest at shorter wavelengths and lowest at longer wavelengths also results in a lower average noise figure.

The high pump efficiency configuration utilizes slightly more launched signal power than the flat profile configuration, but uses the least total pump power of all of the examples. Decreased pump power facilitates use of lower powered, less expensive pumps, or fewer pumps.

In any case, all of these designs can result in a substantially flat overall gain curve for the amplifier across a bandwidth of over eighty nanometers, in some embodiments over 100 nanometers. At the same time, the noise figure associated with the amplifier either is maintained at an acceptable level for all wavelengths, or is not a problem because launched signal powers are selected to provide a desired SNR given the noise figure at each wavelength. This results in effective system performance, while minimizing the required signal launch power.

Figure 9:
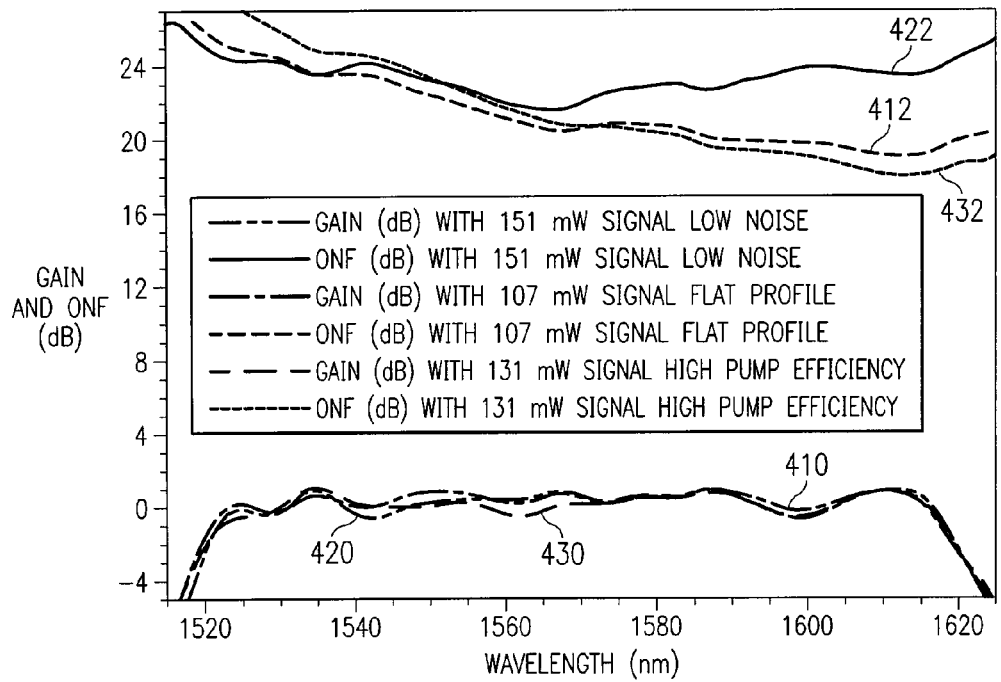
FIG. 9 is a graph illustrating simulated results of another amplifier design implementing various combinations of gain profiles.

FIG. 9 is a graph illustrating simulated results of a similar amplifier design as that shown in FIG. 8. This example assumes a two stage Raman amplifier comprising a distributed Raman amplification stage followed by a discrete Raman amplification stage. The distributed Raman amplification stage implements approximately eighty kilometers of non-zero dispersion shifted fiber (NZDSF), while the discrete Raman amplification stage implements a length of DK-80 dispersion compensating fiber. Table 4 shows pump powers used in the example from FIG. 9:

TABLE 4

| LOW NOISE Applying 151 mW Total Signal Power Varying By Wavelength | | FLAT PROFILE Applying 107 mW Total Signal Power Varying By Wavelength | | HIGH PUMP EFF. Applying 131 mW Total Signal Power Varying By Wavelength | |
|---|---|---|---|---|---|
| Pump λ | Power | Pump λ | Power | Pump λ | Power |
| 80 km NZDSF | | 80 km NZDSF | | 80 km NZDSF | |
| 1396 nm | .38 | 1396 nm | .343 | 1396 nm | .343 |
| 1416 nm | .38 | 1416 nm | .343 | 1427 nm | .343 |
| 1427 nm | .35 | 1427 nm | .343 | 1455 nm | .153 |
| 1455 nm | .1 | 1455 nm | .153 | 1472 nm | .092 |
| 1472 nm | .05 | 1472 nm | .0612 | 1505 nm | .153 |
| 1505 nm | .0085 | 1505 nm | .052 | DK-80 | |
| DK-80 | | DK-80 | | 1396 nm | .56 |
| 1405 nm | .38 | 1405 nm | .47 | 1416 nm | .56 |
| 1418 nm | .45 | 1418 nm | .55 | 1427 nm | .20 |
| 1445 nm | .53 | 1445 nm | .33 | 1445 nm | .23 |
| 1476 nm | .2 | 1476 nm | .083 | 1476 nm | .035 |
| 1509.5 nm | .09 | 1509.5 nm | .023 | 1509.5 nm | .0095 |
| Total Pump Power: 2.9185 W | | Total Pump Power: 2.7512 W | | Total Pump Power: 2.6785 W | |

As discussed above, the embodiment shown in FIG. 4 has been referred to as a "low noise" embodiment, because it provides one mechanism for dealing with the effects of thermally induced noise in Raman amplifiers. In particular, that embodiment strives to provide in an early amplification stage high amplification to short wavelengths closest to the longest pump wavelength, while reducing the power of the longest pump wavelength to reduce thermally induced noise in that stage. To counteract the low power level of the longest pump wavelength in the early stage, a higher power level is supplied at the longest pump wavelength in a later stage.

One side effect of some techniques using complementary gain profiles is the creation of multi-path interference (MPI) due to the relatively high peak amplification levels applied. One way to deal with the MPI is to implement several stages of amplification in each amplifier so that a portion of the gain is generated in each stage. This helps to avoid applying very high gain levels in any one stage.

Figure 10:
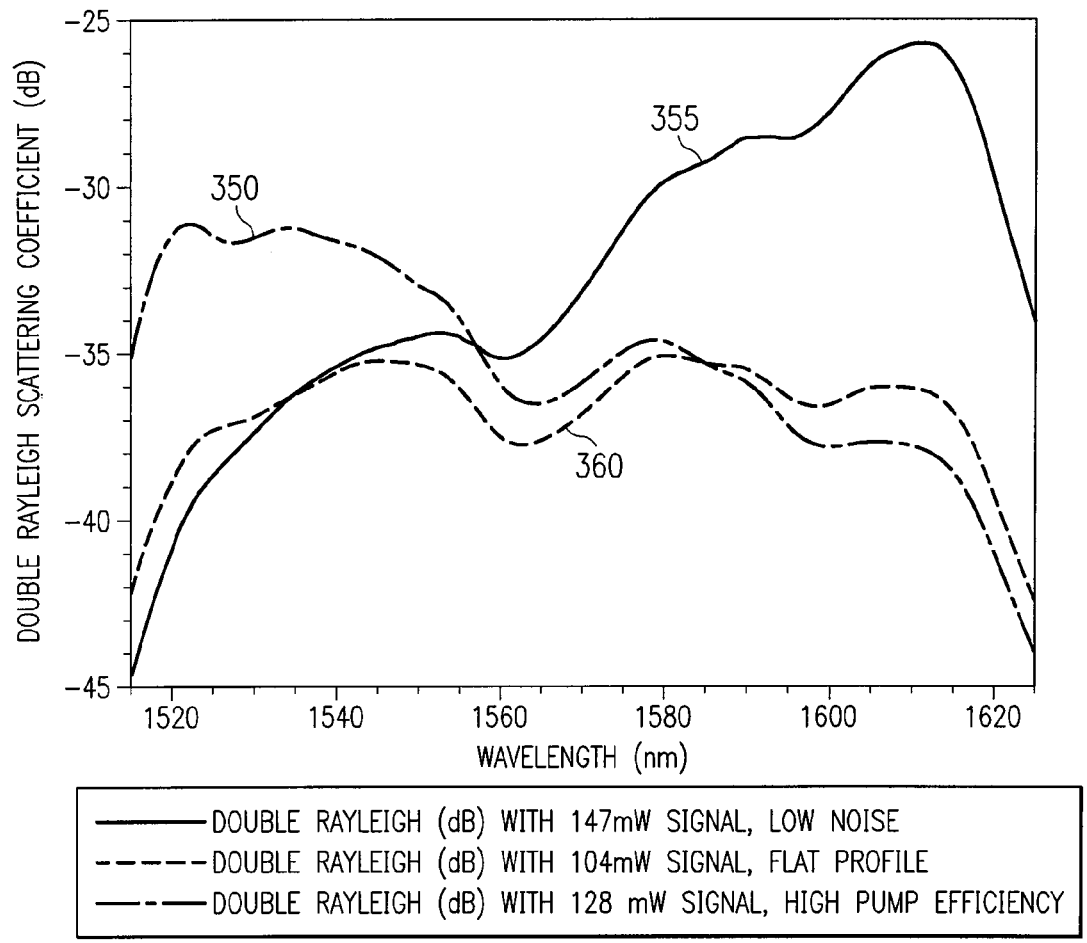
FIG. 10 is a graph illustrating levels of double-Rayleigh scattering associated with various amplifier designs.

FIG. 10 is a graph showing double-Rayleigh scattering (DRS) levels for the "Low Noise," "Flat Gain," and "High Pump Efficiency" embodiments described above in reference to FIG. 8. To a large extent, double-Rayleigh scattering can set a lower limit on MPI in a system. In this graph, line 350 shows the DRS level for the "High Pump Efficiency" design, while line 355 shows the DRS level for the "Low Noise" design. Line 360 shows the DRS level for the "Flat Gain" design. This graph confirms that MPI can be significantly reduced by using amplifier designs with approximately flat gain profiles, as compared to amplifiers with widely varying gain profiles.

Figure 11A:
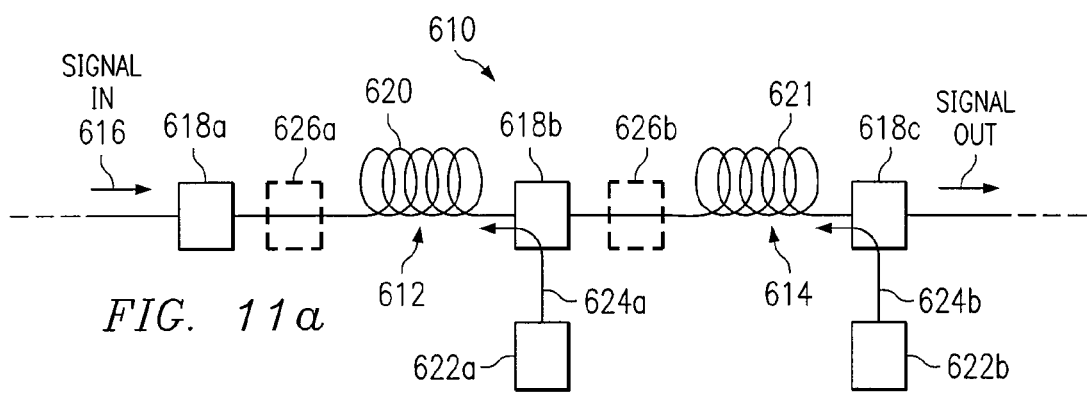
FIGS. 11a–11c illustrate an exemplary embodiment of a two stage amplifier, gain profiles associated with various amplification stages of the amplifier, and an overall gain profile for the amplifier, respectively.
Figure 11B:
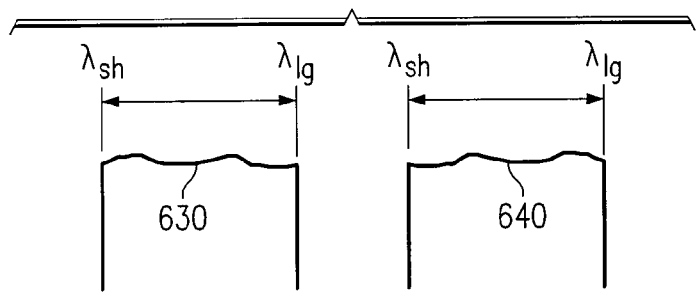
Figure 11C:
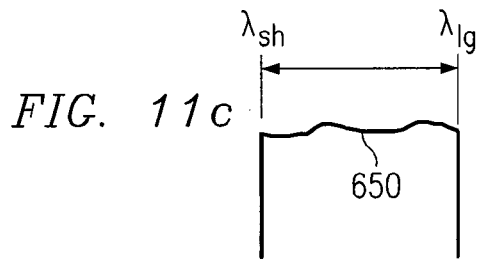

One aspect of this disclosure recognizes that it is possible to deal with the problem of thermally induced noise without using numerous amplifier stages and while maintaining acceptable MPI levels. FIGS. 11a–11c show one example of such a technique.

FIGS. 11a–11c illustrate yet another embodiment and corresponding gain profiles of an amplifier 610 operable to receive and utilize input signals having pre-emphasized input powers. Amplifier 610 shown in FIG. 11a is similar in structure and function to amplifier 100 shown in FIG. 4a. Like amplifier 100 shown in FIG. 4a, amplifier 610 of FIG. 11a includes a first amplification stage 612 and a second amplification stage 614. Each of stages 612 and 614 includes a gain medium 620, 621, respectively, which is operable to receive multiple wavelength input signal 616 and pump wavelengths 624a and 624b, respectively.

In this example, both first stage 612 and second stage 614 comprise Raman amplification stages. Either or both of first and second amplification stages 612, 614 could comprise discrete Raman amplifiers or distributed Raman amplifiers. In this particular example, at least one amplification stage comprises a distributed Raman amplifier having a gain medium with a length of at least 20 kilometers. Other embodiments may use a gain medium having a length of, for example, at least 35 kilometers, 75 kilometers, or more.

In this embodiment, isolators 626 residing between amplification stages are optional. MPI is nevertheless reduced, at least in part, by applying substantially flat gain profiles to signal 616. These embodiments can maintain MPI levels as low as −20 decibels, −33 decibels, −50 decibels, or better, while applying substantially flat gain profiles in each stage. In these examples, the maximum gain level applied to at least most of signals 616 varies from the minimum gain level applied by no more than 10 decibels. Other embodiments may have more flat gain profiles, varying by no more than 5 decibels, 2 decibels, 1 decibel, or less.

By avoiding application of high gain levels to signal 316, amplifier 610 is able to reduce the level of MPI created. At the same time, by implementing a pre-emphasized signal spectrum having a primarily negative slope as wavelength increases, the worst case signal to noise ratio is controlled despite the presence of thermally induced noise. In particular, by using a negatively sloped signal spectrum, shorter signal wavelengths (which are typically closest to the pump wavelengths) are pre-emphasized to overcome thermally induced noise.

At the same time, this configuration supports constructive signal-signal interaction, allowing the use of lower powered long signal wavelengths. The lower powered long signal wavelengths, in turn, allow the use of lower powered pumps at the long wavelength pump signals. This reduces thermally induced noise from the longer wavelength pump signals to the shorter wavelength signals. Overall, this configuration can result in lower total input signal power, better or equivalent signal to noise ratios, and reduced MPI.

Note that mid-stage access elements, such as cross-connects or add/drop multiplexers could be used with an embodiment as shown in FIG. 11a.

Figure 12:
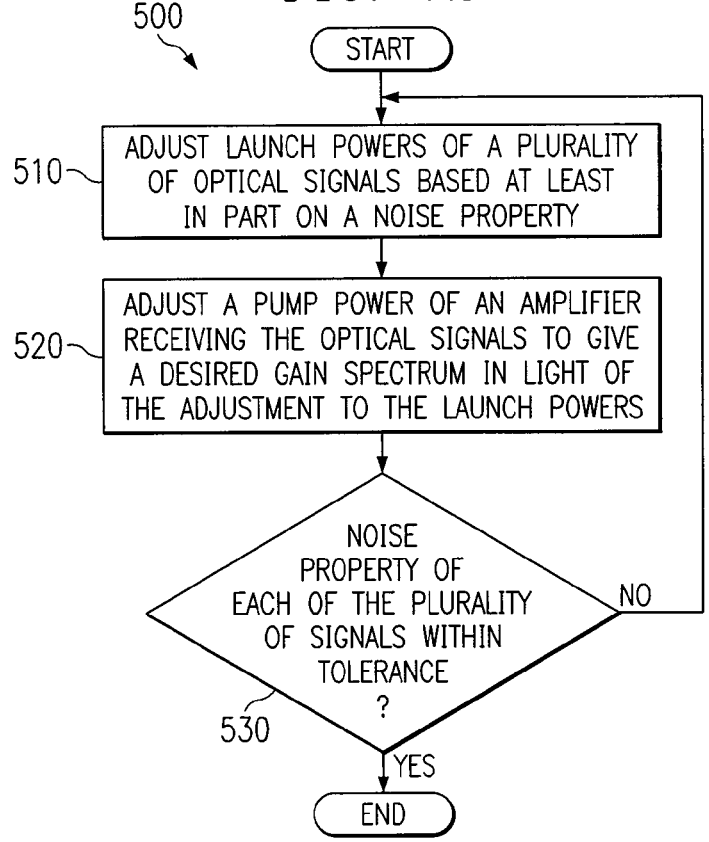
FIG. 12 is a flow chart illustrating one example of a method of determining a launch power for a wavelength signal in a multiple span communication system.

FIG. 12 is a flow chart illustrating one example of a method 500 of determining a launch power for a wavelength signal in a multiple span communication system. For ease of description, method 500 will be described with reference to communication system 10 shown in FIG. 1. Method 500 could, however, apply to other optical communication systems, subsystems, or amplifiers.

The noise figure of an amplifier or a system is affected by the power of the signals input to the amplifier and by the power of the pump signals supplied by the amplifier. Changing the launch power of input signals as a function of the noise figure can, therefore, change the noise figure making it desirable to further change the launch power of the input signals and/or pump signals, or to change the output signal spectra by use of controlled spectral attenuators, such as gain equalizers.

With this in mind, method 500 begins at step 510 by adjusting the launch power of at least some of the signals 15 as a function of the noise figure of at least a portion of optical link 25. This could involve, for example, adjusting the launch power of some or all of signals 15 according to the following equation:

$$P_s = SNR_{out} + 10 \log (BW/1 \text{ Hz}) - 154.01 + NF - 10 \log (\lambda/1 \text{ micron})$$

where $P_s$ is the launch power, $SNR_{out}$ is the desired signal to noise ratio, BW is the detection bandwidth corresponding to each signal 15 being communicated, NF is the noise figure, and $\lambda$ is the wavelength of the signal being adjusted.

Although this example discusses adjusting launch powers with respect to only one desired signal to noise ratio, signals 15 could, alternatively, be grouped and have launch powers for each group determined with respect to a different signal to noise ratio. Moreover, although this example discusses making adjustments to launch power based on SNR, other characteristics, such as noise figure, bit error rate, or a Q-factor could be used.

The adjustment to the launched signal power can be accomplished through a variety of mechanisms. For example, launch powers could be adjusted by controlling drive current(s) supplying transmitters that generate signals 15 and/or by controlling the temperature of the optical sources generating signals 15. Alternatively, variable attenuators can be used to selectively attenuate signals 15 after each is generated at a constant power level, or an amplifier gain level could be controlled to selectively amplify signals 15 generated at a constant power. As still another example, a bias voltage to a modulator modulating signals 15 could be controlled to selectively control the maximum level of high bits in a digital data sequence. As still another example, "dummy light" can be controlled to selectively control a saturation level of amplifiers receiving signals 15.

Step 510 may be performed, for example, on an initial system setup, or could be performed throughout operation of system 10 to maintain the SNR despite changes to system characteristics. In one embodiment, step 510 is performed manually. In other embodiments, step 510 can be performed automatically by or with the assistance of link manager 35.

Changes to the launch power spectrum can affect the gain profile of amplifiers in link 25. System 10 adjusts pump powers to at least some amplifiers in link 25 at step 520 to retain a desired gain profile in light of the changes to the launch power spectrum. This can be done, for example, by adjusting drive currents to pump sources, or by adjusting variable attenuators coupled to pump sources. Alternatively, or in addition, system 10 could utilize adjustable spectral attenuation devices, such as variable gain equalizers, to attain the same result.

System 10 determines at step 530 whether variations in the signal to noise ratio for the plurality of signals 15 are within an acceptable tolerance. For example, it may be desired to have the signal to noise ratio for each signal vary by no more than 2.5 decibels from its target value. Or, it may be desired to have the signal to noise ratio remain extremely close to its design value (e.g., within 0.1 decibels or less) over each of the plurality of signals 15.

If system 10 determines at step 530 that the signal to noise ratio of the signals of interest exceeds a particular tolerance, system 10 returns to steps 510 and 520, adjusting the launch powers of at least some of signals 15 based at least in part on a noise property associated with link 25 and adjusting pump powers to retain a desired gain profile. This process continues until variations in the signal to noise ratio for the signals 15 of interest are within a desired tolerance.

System 10 may repeat this procedure periodically, on a random basis, or on demand to ensure that variations in the signal to noise ratio remain within the desired tolerance even despite changes in system characteristics, which can change, for example, with the temperature and/or age of components and the number of signals 15 being communicated.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method of communicating optical signals, comprising:
   communicating a plurality of optical signals over an optical communications medium each of the plurality of optical signals comprising a center wavelength;
   wherein each of at least some of the plurality of optical signals comprise a launch power that is a function of a noise property measured at or near the center wavelength of that signal, wherein the noise property measured for each of one or more of the at least some of the plurality of optical signals comprises a Q-factor of that optical signal; and
   wherein launch powers of the plurality of optical signals primarily decrease with increasing center wavelengths of the plurality of optical signals.

2. The method of claim 1, wherein:
   the plurality of optical signals comprise a median wavelength wherein a shorter plurality of wavelengths have shorter wavelengths than the median wavelength and a longer plurality of wavelengths have longer wavelengths than the median wavelength; and
   wherein the primarily decreasing launch powers of the plurality of optical signals result in an aggregate power of the shorter plurality of wavelengths being larger than the aggregate power of the longer plurality of wavelengths.

3. The method of claim 1, wherein each of the plurality of optical signals comprises a different center wavelength.

4. The method of claim 1, wherein the noise property is measured at an end of the optical communications medium.

5. The method of claim 1, wherein the launch power that is a function of the noise property for one or more of the at least some of the plurality of optical signals is determined based at least in part on a measurement of a signal to noise ratio associated with that signal.

6. The method of claim 1, wherein the launch power that is a function of the noise property for one or more of the at least some of the plurality of optical signals is determined based at least in part on a measurement of a bit error rate associated with that signal.

7. The method of claim 1, wherein the launch power that is a function of the noise property for one or more of the at least some of the plurality of optical signals is determined based at least in part on a measurement of a noise figure associated with that signal.

8. The method of claim 1, wherein the launch power that is a function of the noise property is determined for one or more of the at least some of the plurality of optical signals is determined based at least in part on one or more properties of one or more optical signals selected from the group consisting of an optical signal power level, an optical signal power slope, an electrical noise level, an electrical signal to noise ratio, a bit error rate, a Q factor, a multi-path interference level, time, a level of four wave mixing.

9. The method of claim 1, wherein the launch power that is a function of the noise property is determined for one or more of the at least some of the plurality of optical signals is determined based at least in part on one or more properties at wavelengths within a range of the plurality of optical signals, the properties selected from the group consisting of an amplified spontaneous emission level, an optical signal to noise ratio, and a level of four wave mixing.

10. The method of claim 1, wherein the at least some of the plurality of optical signals each comprises a launch power that is a function of a magnitude of the noise property measured within one nanometer of the center wavelength of that signal.

11. The method of claim 1, wherein each of the at least some of the plurality of optical signals experiences an approximately equal signal to noise ratio at an output from the optical communications medium.

12. The method of claim 1, wherein each of the plurality of optical signals comprises a launch power that approximately follows a noise figure of the amplifier as a function of wavelength.

13. The method of claim 1, wherein at least one of the plurality of optical signals experiences a first signal to noise ratio at an output from the communications medium, and wherein a sum of the launch powers of the plurality of optical signals comprises a lower total power than would result from all of the plurality of optical signals being launched at the same launch power sufficient for each of the plurality of optical signals to obtain at least the first signal to noise ratio at the output from the optical communications medium.

14. The method of claim 1, further comprising amplifying the plurality of optical signals using Raman amplification to at least partially compensate for losses associated with one or more of the plurality of optical signals in at least a portion of the optical communications medium.

15. The method of claim 1, wherein all amplifiers coupled in-line to the optical communications medium comprise Raman amplifiers.

16. A method of communicating optical signals, comprising:
   communicating within an optical communication medium a plurality of optical signals each having an input signal power when entering the communication medium;
   measuring a signal characteristic associated with at least some of the plurality of optical signals that varies over the wavelengths of the plurality of optical signals, wherein the measured signal characteristic for each of one or more of the at least some of the plurality of optical signals comprises a noise figure of that optical signal;

adjusting, based at least in part on the measured signal characteristic, the input signal power of at least some of the plurality of optical signals to result in a reduction in variation of the signal characteristic over the wavelengths of the plurality of optical signals;

wherein the adjusted input signal powers of the plurality of optical signals primarily decrease with increasing center wavelengths of the plurality of optical signals.

17. The method of claim 16, wherein:

the plurality of optical signals comprise a median wavelength wherein a shorter plurality of wavelengths have shorter wavelengths than the median wavelength and a longer plurality of wavelengths have longer wavelengths than the median wavelength; and wherein the primarily decreasing launch powers of the plurality of optical signals result in an aggregate power of the shorter plurality of wavelengths being larger than the aggregate power of the longer plurality of wavelengths.

18. The method of claim 16, wherein the signal characteristic is measured at an end of the communication medium.

19. The method of claim 16, wherein the signal characteristic comprises a characteristic associated with one or more of the plurality of optical signals and selected from a group consisting of a signal to noise ratio, a bit error rate, and a Q-factor.

20. The method of claim 16, wherein the reduction in variation for the at least some of the plurality of optical signals comprises a reduction in variation of the signal to noise ratio.

21. The method of claim 16, wherein the signal characteristic comprises a characteristic measured with respect to another of the plurality of optical signals.

22. The method of claim 16, further comprising amplifying the plurality of optical signals using Raman amplification to at least partially compensate for losses associated with one or more of the plurality of optical signals in at least a portion of the optical communications medium.

23. The method of claim 16, wherein at least one of the plurality of optical signals experiences a first signal to noise ratio, and wherein a sum of the input signal powers of the plurality of optical signals comprises a lower total power than would result from all of the plurality of optical signals being launched at the same launch power sufficient for each of the plurality of optical signals to obtain at least the first signal to noise ratio at the output from the optical communications medium.

24. A method of communicating optical signals, comprising:

communicating a plurality of optical signals to an optical communications medium, at least one of the plurality of optical signals associated with a first signal to noise ratio at an output from the optical communications medium;

wherein each of at least some of the plurality of optical signals comprises a launch power that is a function of a measured at or near a center wavelength of that signal; and wherein a sum of the launch powers of the plurality of optical signals comprises a lower total power than would result from all of the plurality of optical signals being launched at the same launch power sufficient for each of the plurality of optical signals to obtain at least the first signal to noise ratio at the output from the optical communications medium.

25. The method of claim 24, wherein each of the plurality of optical signals comprises a different center wavelength.

26. The method of claim 24, wherein the noise property is measured at an end of the optical communications medium.

27. The method of claim 24, wherein the at least one of the plurality of optical signals comprises a lowest signal to noise ratio of the plurality of optical signals.

28. The method of claim 24, wherein the launch power that is a function of the noise property is determined at least in part based on one or more measurements selected from a group consisting of a signal to noise ratio, a bit error rate, a Q-factor, and a noise figure.

29. The method of claim 24, wherein the at least some of the plurality of optical signals each comprises a launch power that is a function of a magnitude of the noise property measured within one nanometer of the center wavelength of that signal.

30. The method of claim 24, wherein each of the at least some of the plurality of optical signals experiences an approximately equal signal to noise ratio at an output from the optical communications medium.

31. The method of claim 24, wherein each of the plurality of optical signals comprises a launch power that approximately follows a noise figure of the amplifier as a function of wavelength.

32. The method of claim 24, wherein the launch powers of the plurality of optical signals primarily decrease with increasing center wavelengths of the plurality of optical signals.

33. The method of claim 24, further comprising amplifying the plurality of optical signals using Raman amplification to at least partially compensate for losses associated with one or more of the plurality of optical signals in at least a portion of the optical communications medium.

34. A method of communicating optical signals, comprising:

communicating to an optical communication medium a plurality of optical signals each initially having an approximately equal input signal power when entering the communication medium, wherein a sum of the input signal powers of the plurality of optical signals comprises a total input signal power;

measuring a signal characteristic associated with the plurality of optical signals that varies over the wavelengths of the plurality of optical signals;

adjusting, based at least in part on the measured signal characteristic, the input signal power of at least some of the plurality of optical signals to result in a reduction in variation of the signal characteristic over the wavelengths of the plurality of optical signals;

wherein the adjustment in input signal power results in a reduction in the total input signal power compared to a sum of the initial input signal powers.

35. The method of claim 34, wherein the signal characteristic is measured at an end of the communication medium.

36. The method of claim 34, wherein the signal characteristic comprises a characteristic associated with one or more of the plurality of optical signals and selected from a group consisting of a signal to noise ratio, a bit error rate, and a Q-factor.

37. The method of claim 34, wherein the signal characteristic comprises a noise figure associated with one or more of the plurality of optical signals.

38. The method of claim 34, further comprising amplifying the plurality of optical signals using Raman amplification to at least partially compensate for losses associated with one or more of the plurality of optical signals in at least a portion of the optical communications medium.

39. The method of claim 34, wherein the adjusted input signal powers of the plurality of optical signals primarily decrease with increasing center wavelengths of the plurality of optical signals.

40. An optical amplifier comprising:
a gain medium operable to communicate a plurality of optical signals each comprising a center wavelength; and
one or more pump sources operable to generate one or more pump signals for introduction to the gain medium to facilitate Raman amplification of at least some of the plurality of optical signals within the gain medium;
wherein at least a portion of the optical amplifier is associated with a noise property that varies with wavelength, wherein each of at least some of the plurality of optical signals comprises a launch power that is a function of the noise property measured at or near a center wavelength of that signal, and wherein the noise property measured for each of one or more of the at least some of the plurality of optical signals comprises a noise figure of that optical signal; and
wherein the launch powers of the plurality of optical signals primarily decrease with increasing center wavelengths of the plurality of optical signals.

41. The optical amplifier of claim 40, wherein:
the plurality of optical signals comprise a median wavelength wherein a shorter plurality of wavelengths have shorter wavelengths than the median wavelength and a longer plurality of wavelengths have longer wavelengths than the median wavelength; and
wherein the primarily decreasing launch powers of the plurality of optical signals result in an aggregate power of the shorter plurality of wavelengths being larger than the aggregate power of the longer plurality of wavelengths.

42. The optical amplifier of claim 40, wherein the amplifier comprises a discrete Raman amplifier.

43. The optical amplifier of claim 40, wherein the amplifier comprises a distributed Raman amplifier.

44. The optical amplifier of claim 40, wherein the noise property is measured at an end of the optical communications medium.

45. The optical amplifier of claim 40, wherein the launch power that is a function of the noise property for one or more of the at least some of the plurality of optical signals is determined based at least in part on one ore more measurements selected from a group consisting of a signal to noise ratio, a bit error rate, a Q-factor, and a noise figure.

46. The optical amplifier of claim 40, wherein the at least some of the plurality of optical signals each comprises a launch power that is a function of a magnitude of the noise property measured within one nanometer of the center wavelength of that signal.

47. The optical amplifier of claim 40, wherein at least one of the plurality of optical signals experiences a first signal to noise ratio measured at an output from a communications medium coupled to the amplifier, and wherein a sum of the launch powers of the plurality of optical signals comprises a lower total power than would result from all of the plurality of optical signals being launched at the same launch power sufficient for each of the plurality of optical signals to obtain at least the first signal to noise ratio at the output from the optical communications medium.

48. The optical amplifier of claim 40, wherein the amplifier comprises a multiple stage amplifier, comprising:
a first amplifier stage operable to amplify the plurality of signals;
a second amplifier stage operable to amplify at least some of the plurality of optical signals after those signals have been amplified by the first stage;
wherein the first and second amplifier stages each comprise an approximately flat gain profile.

49. The optical amplifier of claim 48, wherein the combined effect of the first and second amplifier stages contributes to an approximately flat overall gain profile over the plurality of signal wavelengths.

50. An optical communication system, comprising:
one or more optical sources operable to generate a plurality of optical signals each comprising a center wavelength;
a plurality of Raman amplifiers coupled to a multiple span communications medium carrying the plurality of optical signals; and
a controller operable to measure a signal characteristic associated with the plurality of optical signals that varies with wavelength, and to adjust based at least in part on the measured signal characteristic an input signal power of at least some of the plurality of optical signals, wherein the measured signal characteristic for each of one or more of the at least some of the plurality of optical signals comprises a noise figure of that optical signal;
wherein the adjustment of the input signal power results in a reduction in variation of the signal characteristic over the wavelengths of the plurality of optical signals, and wherein the adjustment in input signal power results in input signal powers that primarily decrease with increasing center wavelengths of the plurality of optical signals.

51. The system of claim 50, wherein:
the plurality of optical signals comprise a median wavelength wherein a shorter plurality of wavelengths have shorter wavelengths than the median wavelength and a longer plurality of wavelengths have longer wavelengths than the median wavelength; and
wherein the primarily decreasing launch powers of the plurality of optical signals result in an aggregate power of the shorter plurality of wavelengths being larger than the aggregate power of the longer plurality of wavelengths.

52. The system of claim 50, wherein the signal characteristic comprises a characteristic associated with one or more of the plurality of optical signals and selected from a group consisting of a signal to noise ratio, a bit error rate, and a Q-factor.

53. The system of claim 50, wherein the signal characteristic comprises a noise figure associated with one or more of the plurality of optical signals and wherein the reduction in variation comprises a reduction in variation of the signal to noise ratio.

54. The system of claim 50, wherein at least one of the plurality of optical signals experiences a first signal to noise ratio, and wherein a sum of the launch powers of the plurality of optical signals comprises a lower total power than would result from all of the plurality of optical signals being launched at the same launch power sufficient for each of the plurality of optical signals to obtain at least the first signal to noise ratio at the output from the optical communications medium.

55. The system of claim 50, wherein at least one of the plurality of Raman amplifiers comprises a multiple stage amplifier, comprising:
a first amplifier stage operable to amplify the plurality of signals;
a second amplifier stage operable to amplify at least some of the plurality of optical signals after those signals have been amplified by the first stage;
wherein the first and second amplifier stages each comprise an approximately flat gain profile.

56. The system of claim 55, further comprising at least one additional amplification stage coupled between the first and second Raman amplification stages.

57. An optical communication system, comprising:
one or more optical sources operable to generate a plurality of optical signals each comprising a center wavelength and having an initial input power;
a plurality of Raman amplifiers coupled to a multiple span communications medium carrying the plurality of optical signals; and
a controller operable to measure a signal characteristic associated with the plurality of optical signals that varies with wavelength and to adjust, based at least in part on the measured signal characteristic, an input signal power of at least some of the plurality of optical signals;
wherein the adjustment of the input signal power results in a reduction in variation of the signal characteristic over the wavelengths of the plurality of optical signals, and wherein the adjustment in input signal power results in a reduction in the total input signal power compared to the sum of the initial input powers.

58. The system of claim 57, wherein the signal characteristic comprises a characteristic associated with one or more of the plurality of optical signals and selected from a group consisting of a signal to noise ratio, a bit error rate, and a Q-factor.

59. The system of claim 57, wherein the signal characteristic comprises a noise figure associated with one or more of the plurality of optical signals and wherein the reduction in variation comprises a reduction in variation of the signal to noise ratio.

60. The system of claim 57, wherein the input powers of the plurality of optical signals primarily decrease with increasing center wavelengths of the plurality of optical signals.

61. The system of claim 57, wherein at least one of the plurality of Raman amplifiers comprises a multiple stage amplifier, comprising:
a first amplifier stage operable to amplify the plurality of signals;
a second amplifier stage operable to amplify at least some of the plurality of optical signals after those signals have been amplified by the first stage;
wherein the first and second amplifier stages each comprise an approximately flat gain profile.

62. The system of claim 61, further comprising at least one additional amplification stage coupled between the first and second Raman amplification stages.

63. An optical communication system, comprising:
one or more optical sources operable to generate a plurality of optical signals each comprising a center wavelength;
a plurality of optical amplifiers coupled to a multiple span communications medium carrying the plurality of optical signals, wherein all of the plurality of optical amplifiers are Raman amplifiers; and
a controller operable to measure a signal characteristic associated with the plurality of optical signals that varies with wavelength, and to adjust based at least in part on the measured signal characteristic an input signal power of at least some of the plurality of optical signals, wherein the measured signal characteristic comprises a noise figure of each of at least some of the plurality of optical signals;
wherein the adjustment of the input signal power results in a reduction in variation of the signal characteristic over the wavelengths of the plurality of optical signals.

64. The system of claim 63, wherein the signal characteristic comprises a characteristic associated with one or more of the plurality of optical signals and selected from a group consisting of a signal to noise ratio, a bit error rate, and a Q-factor.

65. The system of claim 63, wherein the reduction in variation comprises a reduction in variation of the signal to noise ratio.

66. The system of claim 63, wherein the input powers of the plurality of optical signals primarily decrease with increasing center wavelengths of the plurality of optical signals.

67. The system of claim 63, wherein at least one of the plurality of optical signals experiences a first signal to noise ratio, and wherein a sum of the launch powers of the plurality of optical signals comprises a lower total power than would result from all of the plurality of optical signals being launched at the same launch power sufficient for each of the plurality of optical signals to obtain at least the first signal to noise ratio at the output from the optical communications medium.

68. The system of claim 63, wherein at least one of the plurality of Raman amplifiers comprises a multiple stage amplifier, comprising:
a first amplifier stage operable to amplify the plurality of signals;
a second amplifier stage operable to amplify at least some of the plurality of optical signals after those signals have been amplified by the first stage;
wherein the first and second amplifier stages each comprise an approximately flat gain profile.

69. The system of claim 68, further comprising at least one additional amplification stage coupled between the first and second Raman amplification stages.

70. The system of claim 63, wherein a multi-path interference associated with at least some of the plurality of optical signals is no more than −20 decibels.

71. The system of claim 63, wherein a multi-path interference associated with substantially all of the plurality of optical signals is no more than −20 decibels.

* * * * *